United States Patent
Hsu et al.

(10) Patent No.: US 11,562,331 B1
(45) Date of Patent: Jan. 24, 2023

(54) SCHEDULING A SUBSEQUENT MEETING RELATED TO A PREVIOUS MEETING

(71) Applicant: ShoreTel, Inc., Sunnyvale, CA (US)

(72) Inventors: Julie Shur-Meih Hsu, San Jose, CA (US); Priya Bonthu, Palo Alto, CA (US)

(73) Assignee: Mitel Networks, Inc.

( * ) Notice: Subject to any disclaimer, the term of this patent is extended or adjusted under 35 U.S.C. 154(b) by 1396 days.

(21) Appl. No.: 15/662,488

(22) Filed: Jul. 28, 2017

(51) Int. Cl.
*G06Q 10/06* (2012.01)
*G06Q 10/10* (2012.01)

(52) U.S. Cl.
CPC ... *G06Q 10/1095* (2013.01); *G06Q 10/06311* (2013.01); *G06Q 10/10* (2013.01); *G06Q 10/109* (2013.01)

(58) Field of Classification Search
None
See application file for complete search history.

(56) References Cited

U.S. PATENT DOCUMENTS

| | | | |
|---|---|---|---|
| 2005/0034079 A1* | 2/2005 | Gunasekar | G06Q 10/1095 715/753 |
| 2008/0134041 A1 | 6/2008 | Zinn | |
| 2009/0125818 A1* | 5/2009 | Ritter | G06Q 10/109 715/753 |
| 2010/0306018 A1 | 12/2010 | Burtner et al. | |
| 2012/0150577 A1 | 6/2012 | Berg et al. | |
| 2012/0203551 A1 | 8/2012 | Lakshmanan et al. | |
| 2013/0198288 A1 | 8/2013 | Jones et al. | |

* cited by examiner

*Primary Examiner* — Cory W Eskridge

(57) ABSTRACT

A subsequent meeting related to a previous meeting is scheduled, e.g., as a follow-up or forward-to meeting. A session recording of the previous meeting has been generated. Historical data of the previous meeting, e.g., identifiers of attendees, is used to populate fields of an invite form for scheduling the subsequent meeting, along with an indication of the session recording. In some embodiments, the identifiers of the invitees of the subsequent meeting are selected, without user input: from the identifiers of the attendees of the previous meeting, based on a relationship of the invitees of the subsequent meeting to the attendees of the previous meeting, or based on a relationship of the invitees of the subsequent meeting to a subject of the previous meeting. In some embodiments, the session recording of the previous meeting can be presented for review prior to a start time of the subsequent meeting.

18 Claims, 13 Drawing Sheets

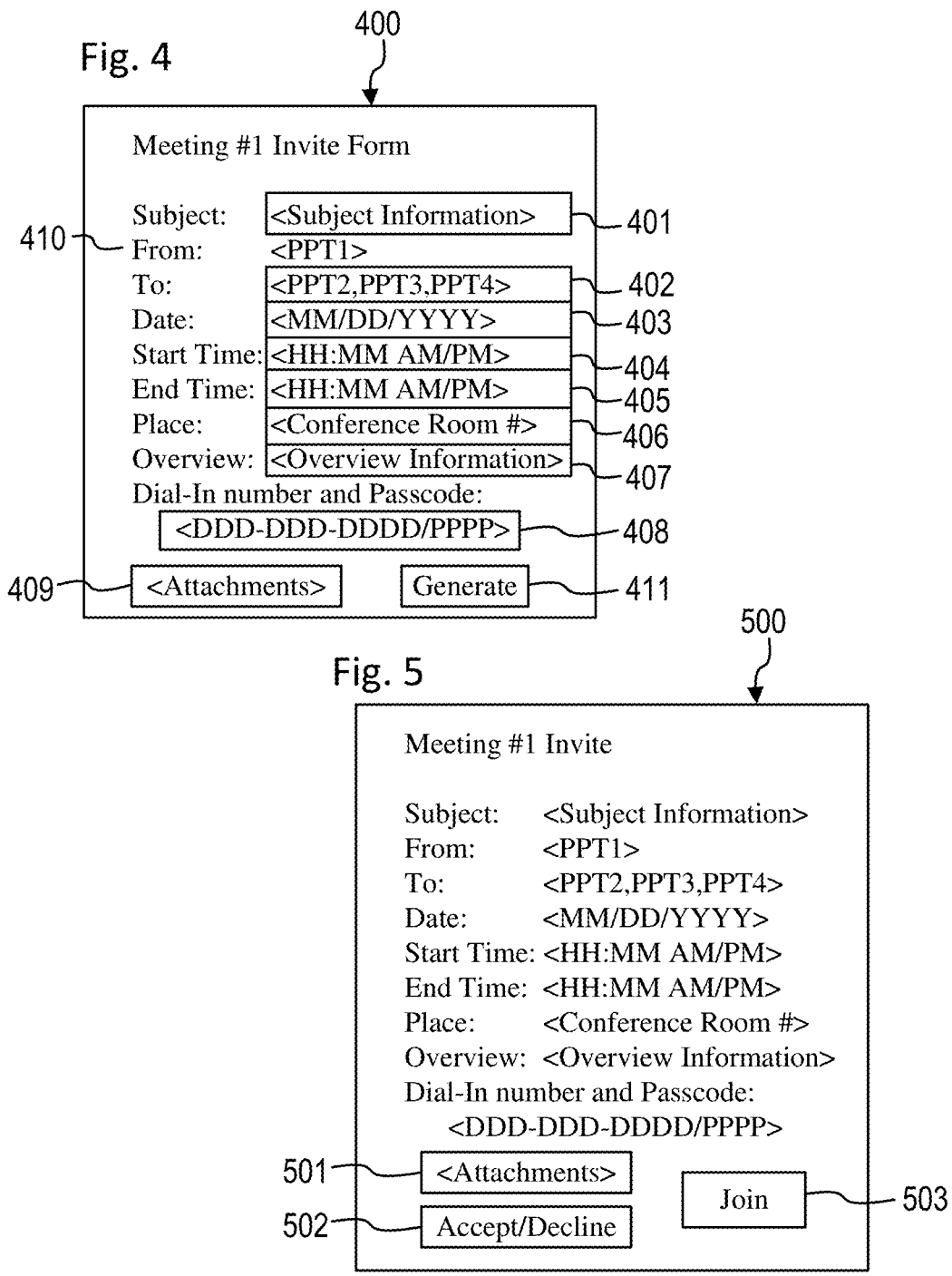

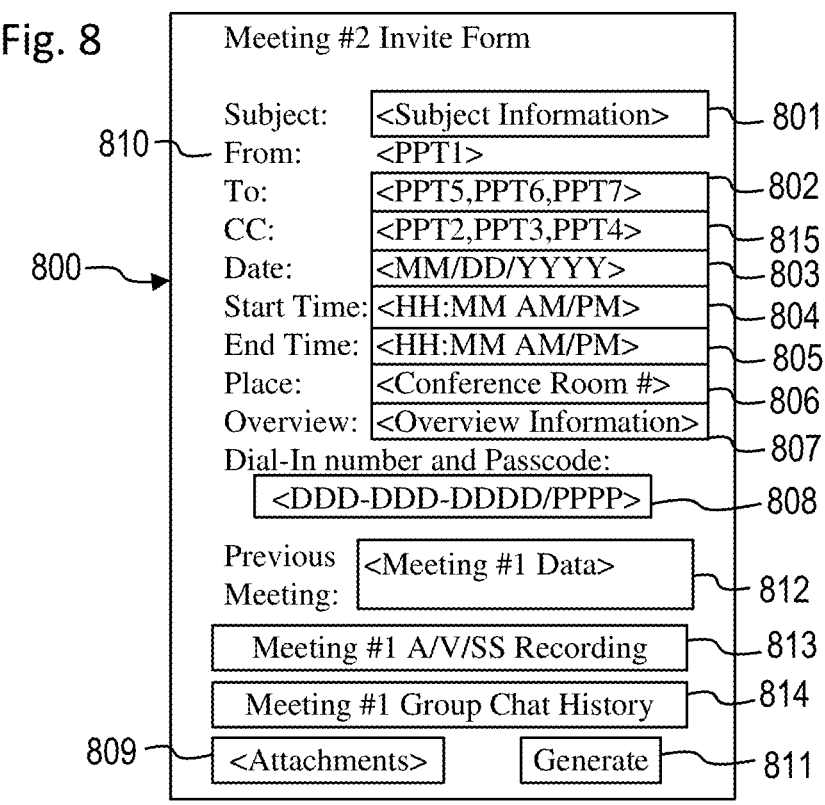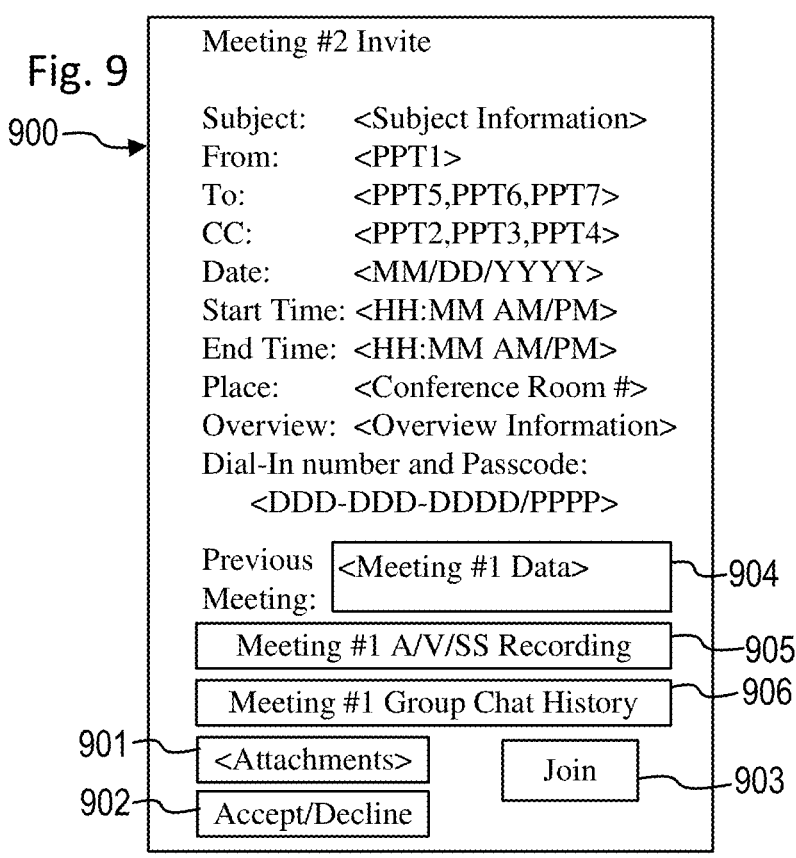

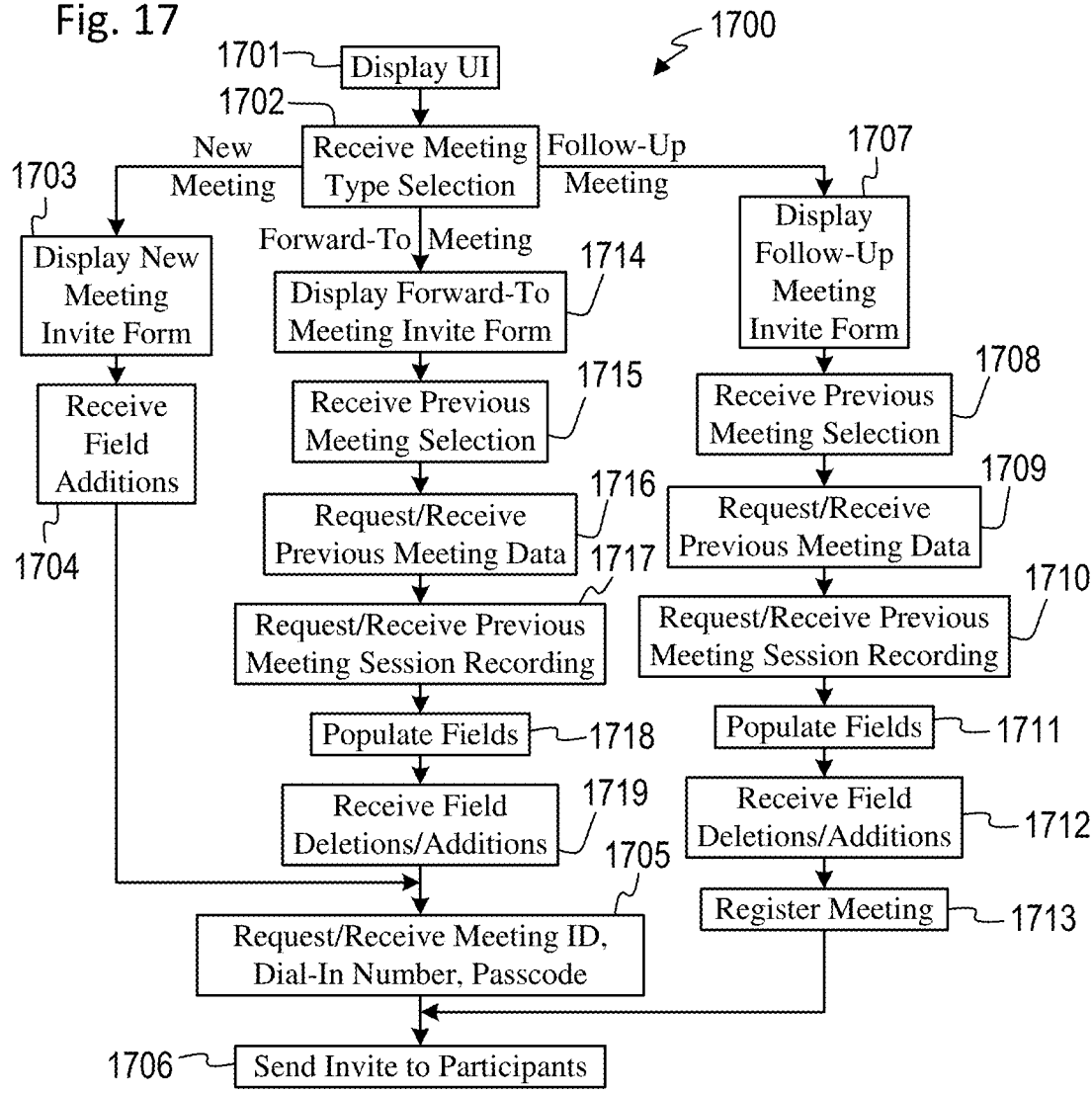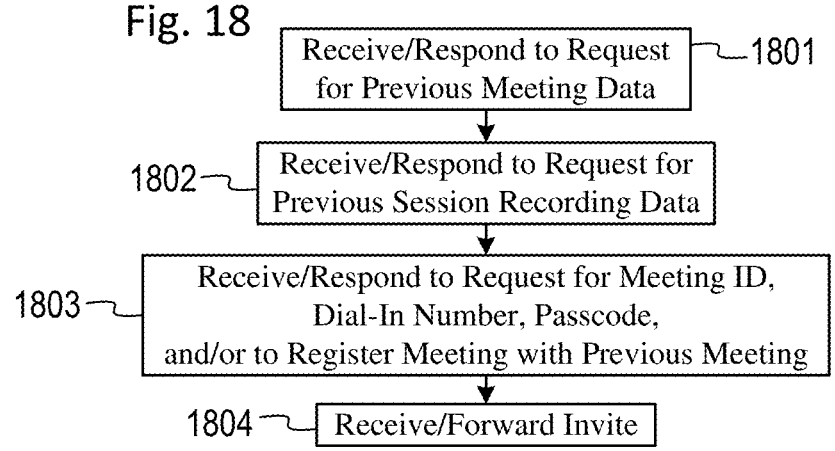

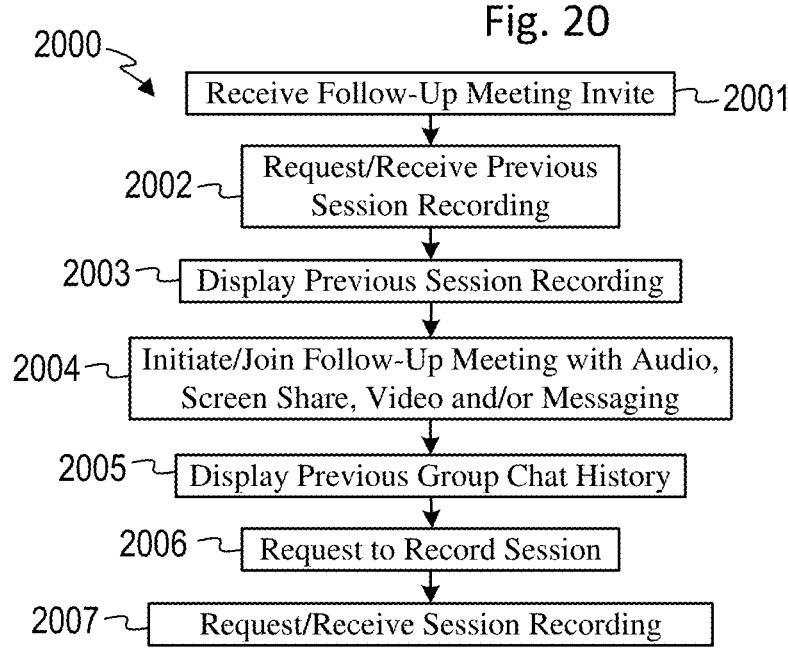
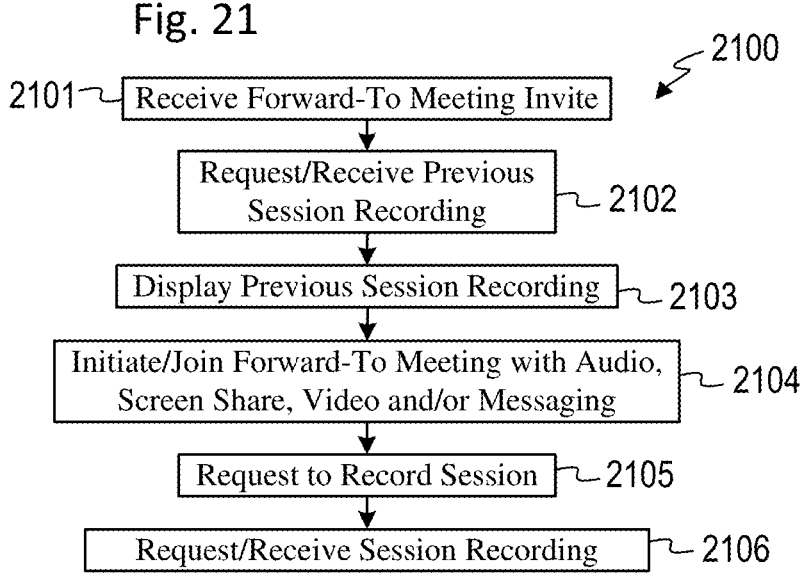

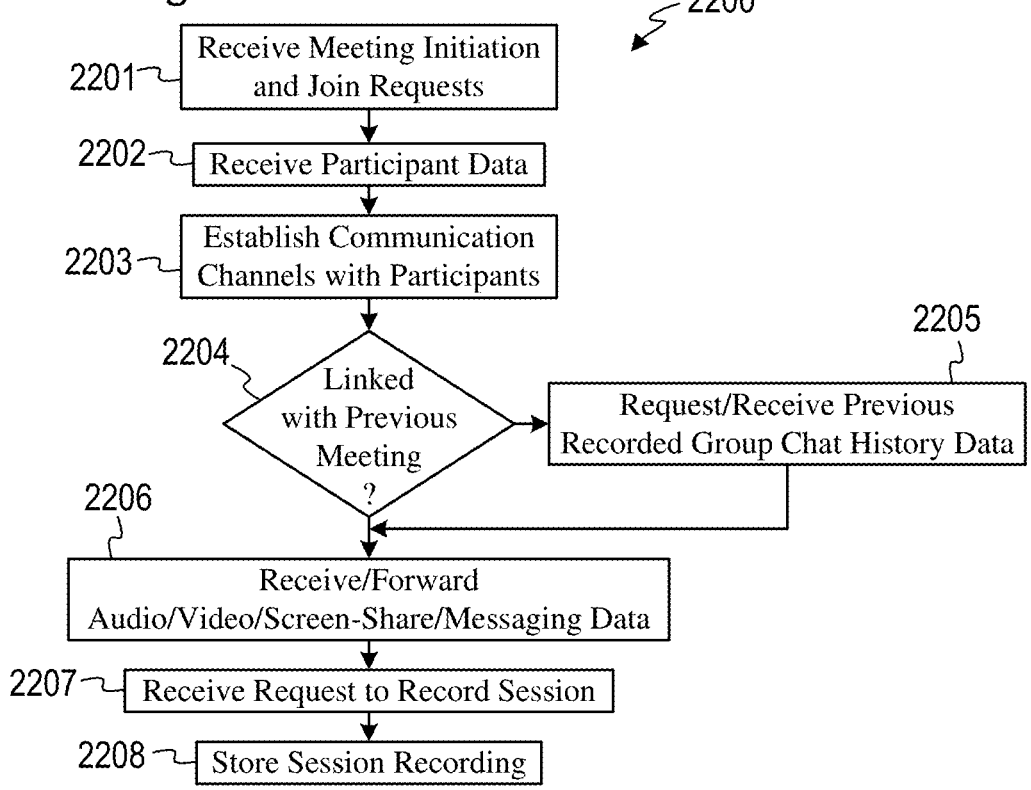

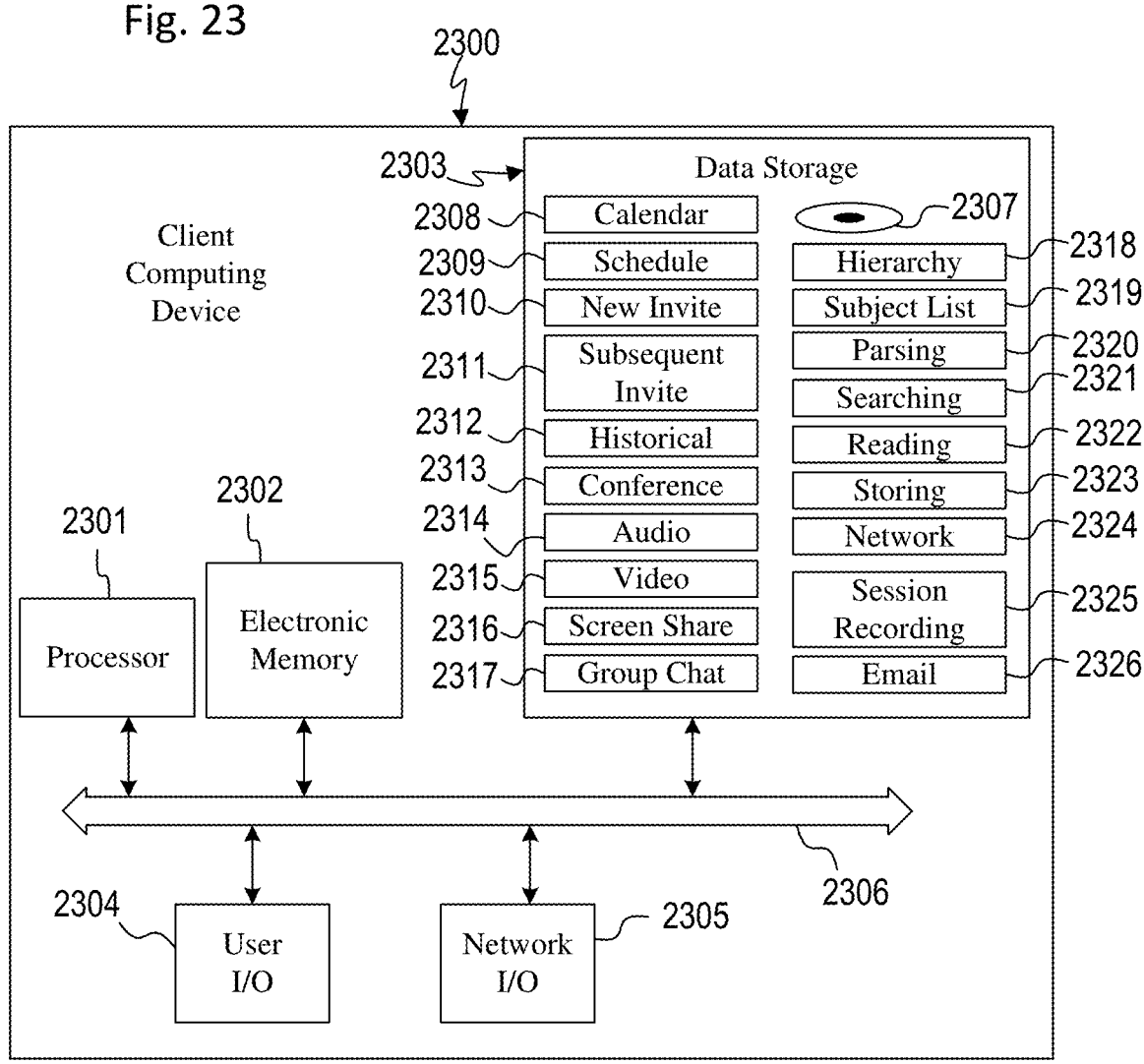

SCHEDULING A SUBSEQUENT MEETING RELATED TO A PREVIOUS MEETING

BACKGROUND

Meetings are a primary communication channel for people who are collaborating on a task, project or venture to discuss important topics, reach conclusions, achieve consensus, craft strategy, and assign responsibilities. In many situations, multiple related meetings must be held in order to continue to move the project forward, allow for input from all contributors, or keep various interested parties informed of its progress. However, there are many factors involved in scheduling multiple meetings that complicate the process. For example, it can be difficult or time consuming to coordinate the calendars of multiple different participants or subsets of participants, each person having different constraints with respect to available time and physical location. Such difficulties are further compounded by having to take into consideration the availability of finite resources, such as meeting rooms, conference equipment resources (e.g., tables, chairs, projectors, microphones, speakers, etc.), dial-in numbers, network bandwidth, etc. Even potentially unlimited items, such as electronic documents or presentations to be shared or discussed during the meeting, need to be accounted for by the meeting organizer or one of the participants in order to ensure that the meeting proceeds smoothly. Consequently, although tools have been developed to assist a meeting organizer to coordinate activities to schedule and execute a meeting, the scheduling process is nevertheless prone to error if all of the above factors are not properly taken into consideration. Additionally, the inherent time lag between related meetings and potential differences in participant attendance can lead to some of the participants not being fully up to speed, thereby negatively affecting the continuity and efficiency of the meetings.

SUMMARY

In some embodiments, a method is performed by a client computing device to receive a user input selection to schedule a subsequent meeting related to a previous meeting that has already been held and for which a session recording has been generated by a conferencing system and stored in a storage system; receive historical data of the previous meeting including identifiers of attendees of the previous meeting; generate an invite form for scheduling the subsequent meeting; populate fields of the invite form with the historical data and an indication of the session recording, wherein the fields include an invitee field, and the populating includes populating the invitee field with identifiers of invitees of the subsequent meeting; generate an invite based on the populated fields of the invite form; and transmit the invite to the invitees of the subsequent meeting.

In some embodiments, a method is performed by at least one server to receive a request for historical data and an indication of a session recording of a previous meeting that has already been held and for which the session recording has been generated by a conferencing system and stored in a storage system, the historical data including identifiers of attendees of the previous meeting, and the client computing device being one of a plurality of client computing devices that also includes other client computing devices; transmit the historical data and the indication of the session recording of the previous meeting; receive a request for data for populating fields of an invite form for a subsequent meeting related to the previous meeting, the fields including an invitee field for identifiers of invitees of the subsequent meeting; transmit the data for populating the fields; receive a request to generate a meeting identifier for the subsequent meeting; transmit the meeting identifier for the subsequent meeting; receiving the meeting invite including the indication of the session recording of the previous meeting and the identifiers of the invitees of the subsequent meeting; and transmit the meeting invite.

In some embodiments, the identifiers of the invitees of the subsequent meeting are selected, without user input, from the identifiers of the attendees of the previous meeting. In some embodiments, the identifiers of the invitees of the subsequent meeting are selected, without user input, based on a relationship of the identifiers of the invitees of the subsequent meeting to the identifiers of the attendees of the previous meeting. In some embodiments, the fields of the invite form include a subject field; the historical data includes a subject of the previous meeting; the subject field is populated, without user input, with the subject of the previous meeting; and the identifiers of the invitees of the subsequent meeting are selected, without user input, based on a relationship of the identifiers of the invitees of the subsequent meeting to the subject of the previous meeting.

In some embodiments, the client computing device displays a user interface including an execution icon that indicates an option to schedule the subsequent meeting; and the receiving of the user input selection to schedule the subsequent meeting includes receiving a selection of the execution icon. In some embodiments, the user interface includes a presentation of the historical data of the previous meeting and at least one other execution icon that indicates an option to access the session recording. In some embodiments, the client computing device downloads the session recording from the storage system upon receiving a user input selection of the at least one other execution icon. In some embodiments, the client computing device displays a user interface including first and second execution icons, the first execution icon indicating an option to schedule a follow-up meeting for the subsequent meeting, and the second execution icon indicating an option to schedule a forward-to meeting for the subsequent meeting; receiving of the user input selection to schedule the subsequent meeting includes receiving a selection of one of the first and second execution icons; receiving of the selection of the first execution icon causes the client computing device to select the identifiers of the invitees of the subsequent meeting from the identifiers of the attendees of the previous meeting; and receiving of the selection of the second execution icon causes the client computing device to select the identifiers of the invitees of the subsequent meeting based on a relationship of the identifiers of the invitees of the subsequent meeting to the identifiers of the attendees of the previous meeting.

In some embodiments, a second client computing device receives the invite; displays the invite with the indication of the session recording of the previous meeting; and presents the session recording of the previous meeting for review by a user of the second client computing device prior to a start time of the subsequent meeting. In some embodiments, displaying the invite includes displaying at least one execution icon that indicates an option to access the session recording; and presenting the session recording is performed upon receiving a user input selection of the at least one execution icon.

In some embodiments, the session recording includes an audio recording, a video recording, a screen share recording, and a group chat recording. In some embodiments, the session recording is attached, without user input, to the invite.

In some embodiments, a non-transitory computer-readable medium includes instructions stored thereon that, when executed on a client computing device, perform the above described methods.

BRIEF DESCRIPTION OF THE DRAWINGS

FIG. 4 is a simplified example invite form for use in scheduling a meeting, in accordance with some embodiments.

FIG. 5 is a simplified example meeting invite for use in scheduling a meeting, in accordance with some embodiments.

FIG. 8 is a simplified example invite form for use in scheduling a subsequent meeting, in accordance with some embodiments.

FIG. 9 is a simplified example meeting invite for use in scheduling a subsequent meeting, in accordance with some embodiments.

FIG. 17 is a simplified flowchart for an example process for scheduling a meeting, in accordance with some embodiments.

FIG. 18 is a simplified flowchart for an example process performed by portions of the meeting coordination system shown in FIG. 1 for scheduling a subsequent meeting, in accordance with some embodiments.

FIG. 19 is a simplified flowchart for an example process related to participating in a meeting, in accordance with some embodiments.

FIGS. 20 and 21 are simplified flowcharts for example processes related to participating in a subsequent meeting, in accordance with some embodiments.

FIG. 22 is a simplified flowchart for an example process performed by portions of the meeting coordination system shown in FIG. 1 for executing a subsequent meeting, in accordance with some embodiments.

FIG. 23 is a simplified schematic diagram of an example client computing device for use in the meeting coordination system shown in FIG. 1, in accordance with some embodiments.

DETAILED DESCRIPTION

Figure 1:
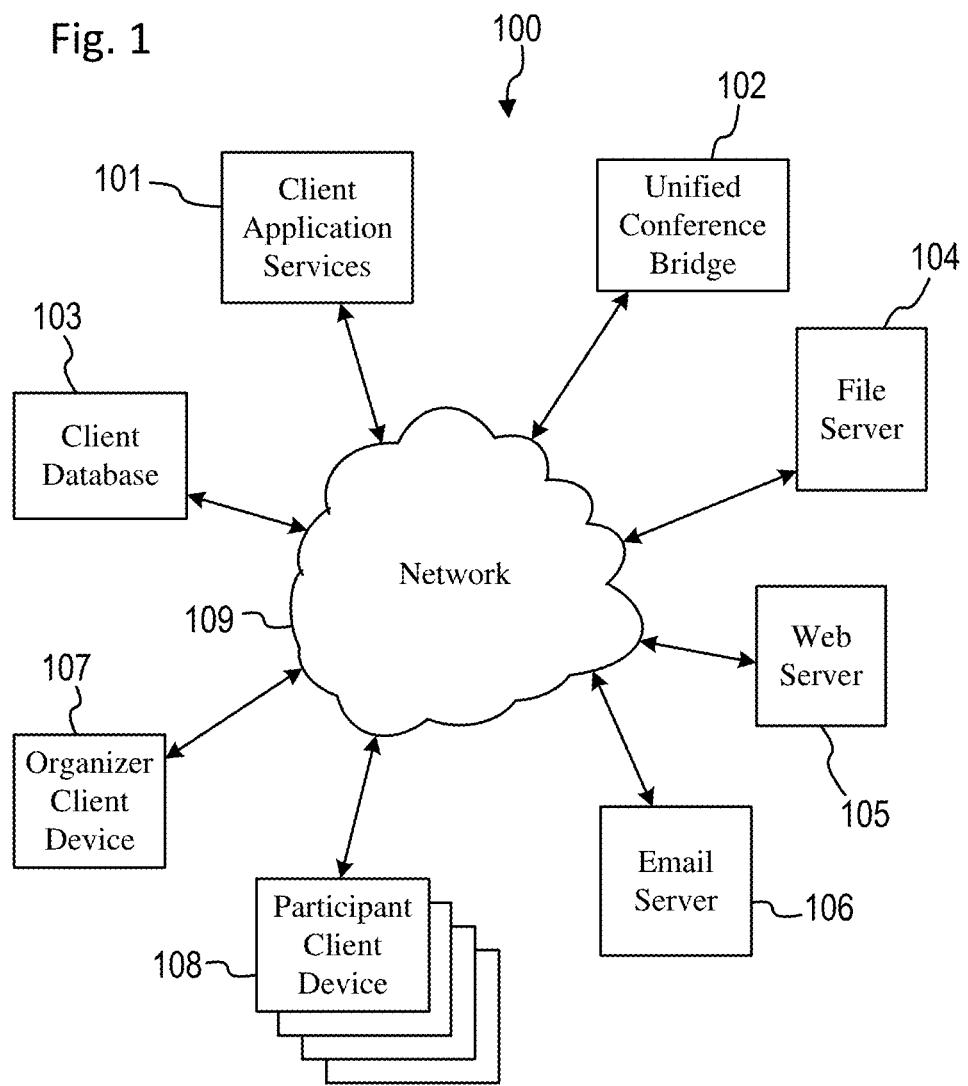
FIG. 1 is a simplified schematic diagram of an example meeting coordination system, in accordance with some embodiments.

As shown in FIG. 1, an improved system 100 for coordinating user activities for scheduling and executing meetings (i.e., a "meeting coordination system"), as described herein, generally includes, uses or communicates with various client application services 101, a unified conference bridge (a conferencing system) 102, a client database 103, a file server 104, a web server 105, an email server 106, client computing devices (e.g., an organizer client device 107 and additional participant client devices 108), and a network 109, among other components not shown or described for simplicity. These components operate, as described below, to enable an improved meeting scheduling process/method that coordinates information between related meetings to reduce the potential for errors in the scheduling process, reduce the time involved in the scheduling process, enhance continuity between previous and subsequent meetings, and increase efficiency in meeting execution, among other benefits, advantages and improvements that will become apparent from the description herein.

The system 100 enables an organizer user (through the organizer client device 107) to schedule a subsequent meeting (following a previous meeting) with other participant users (who use the participant client devices 108) by generating some or all of the data for a meeting invite without additional user input (or with minimal additional user input) from the organizer user. (In some embodiments, the organizer user represents a person acting on behalf of the organizer user, such as an administrative assistant.) In some embodiments, the organizer user schedules a "follow-up" type subsequent meeting for the same (or substantially the same) attendees or invitees of the previous meeting. In some embodiments, the organizer user schedules a "forward-to" type subsequent meeting for attendees or invitees who are different from the attendees or invitees of the previous meeting, or are substantially different therefrom (e.g., perhaps no more than 0-2 of the attendees or invitees of the previous meeting), but who have an interest in the discussion of the previous meeting. In both cases, the organizer user simply selects the type of subsequent meeting to be linked to the previous meeting, and then various portions or components of the system 100 interact with each other to execute a process that uses a combined order of specific rules for selecting data (from a record of the previous meeting) with which to populate fields of a meeting invite form for the subsequent meeting. In accordance with the specific rules, the process then renders the information into a specific format for the meeting invite. The meeting invite is then used and applied to create the desired results of scheduling the subsequent meeting, reserving necessary resources for the subsequent meeting, and providing advance information to the invitees, so that continuity between meetings is enhanced and the subsequent meeting can be efficiently executed.

The specific rules cause the components of the system 100 to use historical data from the record of the previous meeting to select a subject, an organizer (also considered as one of the invitees), other invitees, a date/time, a location, overview information, a dial-in number, a passcode, attachments, and any other appropriate or available information. Additionally, if a session recording (e.g., of audio, video, screen sharing, and/or messaging) was generated for the previous meeting by the conferencing system and stored in a storage system, as indicated by the previous meeting record, then the specific rules further call for acquiring the session recording or a link thereto. This information is then rendered by the system 100 into a specific format for the meeting invite by populating the fields of the meeting invite form with this information, including an indication of the session recording, which may be an attachment thereof or the link thereto. This action of populating the invite form fields is performed without further input from the organizer user, thereby ensuring accuracy, reliability and completeness of the included information. However, the organizer user is then allowed to review and make changes to any of the entries in any of the fields. The invite is then transmitted to the other invitees, and the subsequent meeting is stored within the system 100, thereby scheduling the subsequent meeting and reserving necessary resources while awaiting execution of the subsequent meeting.

In the meantime, before the start of the subsequent meeting, the invitees have access to advance information (i.e., information provided before the meeting) for the subsequent meeting directly via the invite. This advance information includes, not only all of the data and attachments that define the subsequent meeting, but also the session recording of the previous meeting. Before the subsequent meeting, therefore, any of the invitees can view the invite and select an option therein to access any portion of the session recording, including recordings of the audio, video, screen sharing, and/or messaging (e.g., group chat). Invitees of the subsequent meeting, who also attended the previous meeting, can review these recordings to refresh their memory of the discussion topics and decisions, or the subject matter, of the previous meeting. Additionally, invitees of the subsequent meeting, who did not attend the previous meeting, can thus get up to speed or become familiar with the same material. In this manner, continuity is enhanced between the two meetings, and the subsequent meeting can proceed more efficiently or smoothly.

As a consequence, rather than simply storing and comparing data, the interactions of the various components of the system 100 solve various technical problems associated with linking users and resources, generating the subsequent meeting invite, scheduling the subsequent meeting, reserving necessary resources for the subsequent meeting, and providing advance information to the invitees. Additionally, the system and process/method are necessitated by the potential for errors and the need to streamline and reduce the burden placed on users, due to the many factors involved in scheduling multiple meetings that often complicate the process. The combination of the components and functions described herein thus represent improvements in the technologies of communication systems, meeting/activity coordination management, time management, data archiving, and retrieval of meeting related items.

Within the above framework, the users of the system 100 are represented by their individual client computing devices, e.g., organizer client device 107 and the additional participant client devices 108, since it is through their client computing devices 107, 108 that the users interact with other components of the system 100. The client computing devices 107, 108 thus represent any appropriate hardware (e.g., processors, memory, persistent storage devices, etc.) and software for through which the client device functions described herein can be performed, such as computer workstations, desktop computers, notebook computers, tablet computers, smart phones, cell phones, personal digital assistants, voice over Internet protocol (VoIP) phones, video phones, land line phones, smart watches, smart cars, game consoles, virtual reality sets, augmented reality sets etc. The organizer client device 107 is described as the client computing device used by the organizer of the meeting to cause the meeting invite to be generated and the meeting to be scheduled within the system 100 and/or to participate in the meeting through the system 100. The participant client devices 108 are described as the client computing devices used by the other attendees or invitees of the meeting to receive and respond to the meeting invite and/or to participate in the meeting through the system 100.

The client application services 101 generally communicate with the client computing devices 107, 108 to maintain calendar entry data and handle scheduling of meetings and other activities for the users. Additionally, the unified conference bridge 102 is a conferencing system that communicates with the client computing devices 107, 108 to maintain a list of future meetings (including the conference resources reserved for the meetings) and handle or coordinate the executing and recording of meetings between the client computing devices 107, 108. Also, the web server 105 generally communicates with the client computing devices 107, 108 and other components, such as the file server, to provide web based services for accessing files or services by the client computing devices 107, 108.

The client application services 101, the unified conference bridge 102 and the web server 105 thus generally represent one or more physical computer devices or servers, such as web servers, rack-mounted computers, network storage devices, desktop computers, laptop/notebook computers, etc., depending on the complexity of the system 100. In some embodiments implemented at least partially in a cloud network potentially with data synchronized across multiple geolocations, the client application services 101, the unified conference bridge 102 and the web server 105 may be referred to as one or more cloud servers. In some simple embodiments, the functions of the client application services 101, the unified conference bridge 102 and the web server 105 are enabled in a single computer device. In more complex implementations, some of the functions of the client application services 101, the unified conference bridge 102 and the web server 105 are distributed across multiple computer devices, whether within a single server farm facility or multiple physical locations. In some embodiments wherein the client application services 101, the unified conference bridge 102 and the web server 105 represent multiple computer devices, some of the functions of the client application services 101, the unified conference bridge 102 and the web server 105 are implemented in some of the computer devices, while other functions are implemented in other computer devices.

The client database 103 generally stores, organizes and maintains data related to each of the users of the system 100, such as calendar, contact, communication, hierarchy, relationship, project, and task data, among other types of data. The client application services 101 serve as an interface between the client database 103 and the client computing devices 107, 108 for accessing or modifying this data. Additionally, the file server 104 generally stores and maintains data generated during the meetings, such as the session recordings generated by the unified conference bridge 102. The client application services 101, the unified conference bridge 102 and/or the web server 105 serve as interfaces between the file server 104 and the client computing devices 107, 108 for generating or accessing this data.

The client database 103 and the file server 104 thus generally represent data storage systems, including any appropriate hardware (e.g., processors, memory, persistent storage devices, etc.) and software for providing a persistent, scalable, high performance and fast-lookup data store. In some embodiments, the client database 103 and the file server 104 are distributed across one or more networked physical storage units, housings or racks for greater reliability and scalability. Additionally, the client database 103 and the file server 104 may include scalable file systems that are suitable for unstructured data (e.g., emails, attachments, IMs, historical data for creating analytics models, etc.) in large data sets with high throughput access to the data.

The email server 106 generally provides email communication and storage services for the client computing devices 107, 108, as well as for any other system components that have email capability. The email server 106 can also provide email communication services between these components within the system 100 and other entities outside the system 100, such as other potential meeting participants who are not part of the same enterprise or organization as that of the users of the client computing devices 107, 108. In some embodiments, the email server 106 is combined in a suite of products, e.g., Microsoft Exchange Server™, that includes both an email server and a calendaring server. Thus, additional information regarding meetings can also be stored on the email server 106. The email server 106 thus generally represents one or more physical computer devices or servers, such as web servers, rack-mounted computers, network storage devices, desktop computers, laptop/notebook computers, etc., depending on the complexity of the system 100. In some embodiments implemented at least partially in a cloud network potentially with data synchronized across multiple geolocations, the email server 106 may be referred to as one or more cloud servers. In some simple embodiments, the functions of the email server 106 are enabled in a single computer device. In more complex implementations, some of the functions of the email server 106 are distributed across multiple computer devices, whether within a single server farm facility or multiple physical locations. In some embodiments wherein the email server 106 represents multiple computer devices, some of the functions of the email server 106 are implemented in some of the computer devices, while other functions are implemented in other computer devices.

The network 109 generally provides data communication paths between all of the components shown, as well as to computing and networking devices of other entities outside the system 100. In some embodiments, the network 109 represents more than one network or individual data communication link (e.g., a direct link between any two or more of the components shown), whether communicatively coupled together or isolated from each other. Thus, the network 109 generally represents any appropriate wired and wireless hardware and/or software networking components, such as switches, routers, hubs, repeaters, computers, etc., whether physically deployed within the premises of a single enterprise, distributed across multiple physical locations, or part of local or wide area networks, including portions of the World Wide Web or the Internet.

Figure 2:
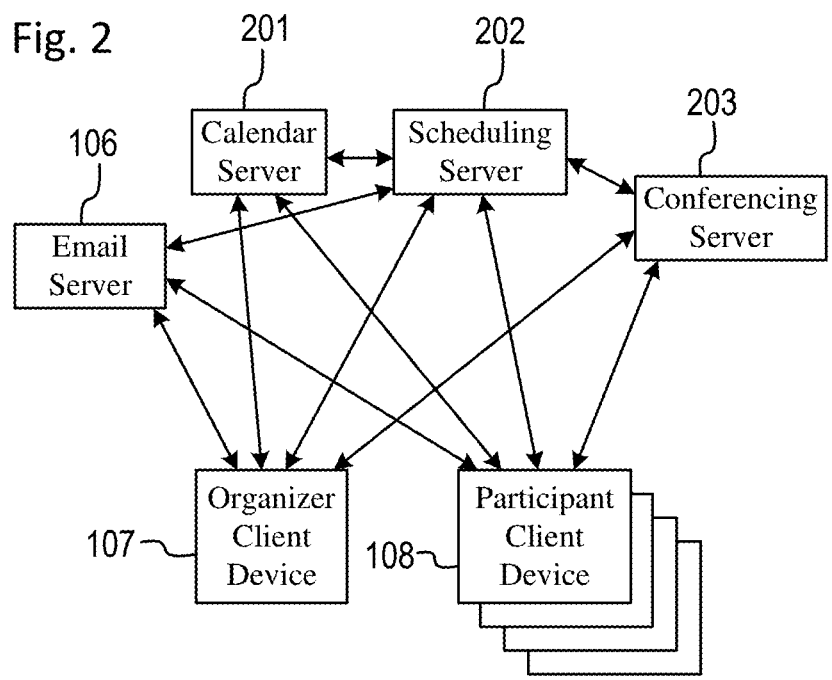
FIG. 2 is a simplified schematic diagram of an example portion of the meeting coordination system shown in FIG. 1 for scheduling a meeting, in accordance with some embodiments.

As shown in FIG. 2, the meeting scheduling functions of the system 100 are described with respect to a calendar server 201, a scheduling server 202, a conferencing server 203, the email server 106, and the client computing devices 107, 108. The calendar server 201 and the scheduling server 202 generally represent the client application services 101, and the conferencing server 203 generally represents the unified conference bridge 102. The functions of the servers 106, 201, 202, 203 can be combined or separated or shared, depending on a given architecture for the system 100. Thus, functions described for one server can be performed by another server in another embodiment, unless otherwise explicitly restricted in the specification or claims. In some embodiments, the functions of the servers 106, 201, 202, 203 are each described as performed by a single server, although this server may represent multiple servers, depending on the desired architecture or implementation.

When a user (i.e., the organizer user) in the system 100 chooses to organize or schedule a meeting, the organizer user causes a user interface to launch on the user's client computer device (i.e., the organizer client device 107). The user interface generally allows for a user input selection to schedule a new meeting or a subsequent meeting, and for scheduling a subsequent meeting, the user interface also generally allows for a user input selection for selecting the previous meeting. Within that general framework, the user interface may appear in a variety of different forms, e.g., as a typical electronic calendar showing various meetings and appointments for some of the days of a month, a specialized meeting schedule interface providing execution icons (e.g., for buttons, drop-down menus, scrolling selections, etc.) for scheduling new or subsequent meetings, or any other appropriate form.

Figure 3:
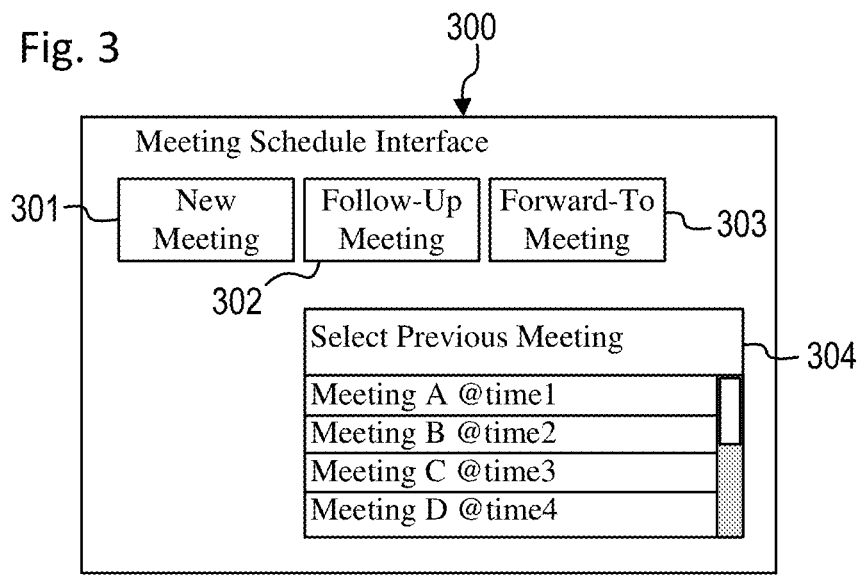
FIG. 3 is a simplified example user interface for use in scheduling a meeting, in accordance with some embodiments.

For illustrative and descriptive purposes, FIG. 3 provides a simplified example of a specialized meeting schedule interface 300 for use in scheduling a new or subsequent meeting, in accordance with some embodiments. For this example, the meeting schedule interface 300 includes execution icons 301, 302, 303 that indicate options to schedule new and subsequent meetings and a (scrolling) menu 304 that indicates or displays previous meetings that can be selected for scheduling subsequent meetings. Meeting identification data for generating the display of the previous meetings in the menu 304 can be read from a storage device within the organizer client device 107 or retrieved from the calendar server 201, which upon a request from the organizer client device 107, receives the meeting identification data from the client database 103 and transmits it to the organizer client device 107.

The user can provide a user input selection of the new meeting icon 301 or one of the subsequent meeting icons (e.g., the follow-up meeting icon 302 or the forward-to meeting icon 303), e.g., by clicking or touching the icon. Additionally, the user can provide a user input selection of one of the previous meetings in the menu 304, e.g., by scrolling through the displayed previous meetings and clicking or touching the space of one of them.

Upon receiving the user input selection of the new meeting icon 301, the organizer client device 107 follows specific rules to generate a user interface for an invite form for creating a meeting invite for a new meeting, i.e., that is unrelated to any previous meeting, as described below with respect to FIGS. 4 and 5. Alternatively, upon receiving the user input selection of one of the subsequent meeting icons 302, 303, along with the user input selection of one of the previous meetings shown in the menu 304, the organizer client device 107 follows specific rules to generate a user interface for an invite form for creating a meeting invite for a subsequent meeting, i.e., that is related or linked to the previous meeting, as described below with respect to FIGS. 6 and 7.

A new meeting invite form generally allows for the organizer user to input data into various fields to define the new meeting. A variety of different formats for different combinations of the fields for a new meeting invite form can be used. In general, the fields typically allow for user input of data for a subject, the invitees, a date/time, a location, an overview, a dial-in number, a passcode, and any attachments. FIG. 4 shows a simple non-limiting example of a new meeting invite form (for a meeting #1) 400 having individual fields for each of these types of user input data. Other embodiments may use other appropriate combinations of fields for a new meeting invite form.

In this example, a subject field 401 includes the general subject (as indicated by generic phrase "<Subject Information>") for the new meeting, such as a project, task, or topic of discussion. An invitee ("To") field 402 includes identifiers (e.g., email addresses, unique names, usernames, etc., as indicated by generic phrase "<PPT2,PPT3,PPT4>") of the invitees or intended participants (abbreviated "PPT") of the new meeting.

Also in this example, a date/time field can be more than a single field for a start date (e.g., date field 403 showing month, day and year, as indicated by generic phrase "<MM/DD/YYYY>"), start time (e.g., start time field 404 showing hour, minute and AM or PM, as indicated by generic phrase "<HH:MM AM/PM>") and end time (e.g., end time field 405 showing hour, minute and AM or PM, as indicated by generic phrase "<HH:MM AM/PM>") for the new meeting. (Alternatively, the date/time field(s) may include a start date, start time and length or a start date/time and end date/time or other appropriate combination of fields.)

Also in this example, a location ("Place") field 406 includes a physical location (as indicated by generic phrase "<Conference Room #>"), such as a conference room, where some or all of the attendees are to gather for the new meeting. The location may be optional, since the new meeting could take place entirely by remote access via the client computing devices 107, 108, phone, video phone, and/or any other appropriate conference participation device. Additionally, multiple locations or location fields may be used if different attendees are to gather at different locations and connect via similar remote access.

Also in this example, an overview field 407 generally includes any comments, descriptions or instructions for the invitees that are not provided in any of the other fields (as indicated by generic phrase "<Overview Information>"). A dial-in number and passcode field 408 includes a phone number, VOIP (voice over Internet Protocol) account, or other access indicator used for remote access for the new meeting and a meeting access code to be entered upon establishing a connection via the dial-in number to join the new meeting (as indicated by generic phrase "<DDD-DDD-DDDD/PPPP>"). An attachment field 409 (or execution icon) includes, or enables the inclusion or attachment of, various electronic documents, presentations or other electronic files to be shared or discussed during the meetings (as indicated by generic phrase "<Attachments>").

Also in this example, the new meeting invite form 400 generally includes an organizer ("From") field 410 indicating an identifier of the organizer user (as indicated by generic phrase "<PPT1>"). However, this field is typically not changeable by the organizer user, except in some embodiments in which the organizer user is organizing the new meeting on behalf of another user.

The organizer client device 107 generally receives and enters data for each of these fields when the organizer user types or pastes the entries into the fields or alternatively when the organizer user selects interface options (e.g., execution icons, menus, etc.) that allow for clicking or touching selections for entering some data or manually requesting the organizer client device 107 or one of the servers 106, 201, 202, 203 to generate the data. User input selections for dates and times, for example, are typically received via pop-up or drop-down menus. For some types of data, to enable the organizer user to select interface options for entering the data, the organizer client device 107 reads the data from a local storage device or requests some of the data from one or more of the servers 106, 201, 202, 203. For example, the organizer client device 107 reads the identifiers of the invitees (e.g., from a locally stored address book) or requests them from the email server 106 or the calendar server 201. Additionally, the organizer client device 107 reads the attachment files (e.g., from a local hard drive, solid state drive, or other mass storage device) or requests them from a networked storage device. To determine available dates and times for the new meeting, the organizer client device 107 reads the availability of the organizer user from a locally stored calendar and requests the availability of the other participant users from the email server 106, the calendar server 201, or the scheduling server 202, requests the availability of appropriate conference rooms from the conferencing server 203, and then the organizer client device 107 compares all of the available time slots. To determine a location for the new meeting, the organizer client device 107 reads the location of the organizer user from a local memory, requests the locations of the other participant users from the email server 106, the calendar server 201, or the scheduling server 202, and requests the locations of available conference rooms from the conferencing server 203, and then the organizer client device 107 compares everyone's locations. To determine a dial-in number and passcode for the new meeting, the organizer client device 107 can request the number and passcode for an available line from the conferencing server 203. The organizer client device 107 also requests the conferencing server 203 to generate a meeting identifier for the new meeting, which it attaches to the resulting invite to identify the new meeting in the system 100. In some embodiments, the organizer client device 107 sends a request to the calendar server 201 or the scheduling server 202 to handle determining some of these options, such as determining available time slots or locations. In response to any of these requests, the receiving server 106, 201, 202, 203 reads the requested data from the appropriate storage, performs the requested function, or calculates the requested data, and then transmits the result to the organizer client device 107.

When the organizer user is satisfied that the entries for each of the fields are complete, the organizer user indicates that the meeting invite is to be generated, e.g., by clicking or touching a generate execution icon 411. The organizer client device 107, thus, receives a user input selection to generate the meeting invite. In response to the user input selection, the organizer client device 107 follows specific rules to generate the meeting invite from all of the data entered into the fields, or sends the data in a request to the scheduling server 202 to generate the meeting invite. Alternatively, if the scheduling server 202 coordinates the entry of the data in the fields, then the organizer client device 107 sends a request to the scheduling server 202 to generate the meeting invite.

The user input selection of the generate execution icon 411 (or another appropriate execution icon) also causes the meeting invite to be sent to the other participant client devices 108. For the meeting invite to be sent, the organizer client device 107 transmits the meeting invite through the email server 106 or the scheduling server 202, or requests/causes the scheduling server 202 to transmit the meeting invite through the email server 106 or directly, to the participant client devices 108 and any other invitee user devices that are not part of the system 100. The generating or sending of the meeting invite to the participant client devices 108, the email server 106 or the scheduling server 202 also results in the organizer client device 107 or the scheduling server 202 transmitting the meeting invite data to the conferencing server 203. The conferencing server 203 enters the new meeting data into a list of meetings.

A variety of different formats for the meeting invite can be used. In general, the meeting invite displays all of the meeting data that was entered into the fields described above. The meeting invite also generally allows for the participant users to view the new meeting data, as well as provides options for the participant users to accept and/or decline the new meeting, to download any attachments, and/or to join the meeting at the start date/time. FIG. 5 shows a simple non-limiting example of a meeting invite (for meeting #1) 500. The example meeting invite 500 includes the meeting data, such as the subject, the organizer user ("From"), the other invitees ("To"), the date/time, the location ("Place"), the overview, the dial-in number, and the passcode. The meeting invite 500 also includes means to download, retrieve or view the attachments (e.g., attachment execution icon 501), to accept or decline the meeting (e.g., accept/decline execution icon 502), and to join the meeting (e.g., join execution icon 503). Other embodiments may display the meeting data and provide the appropriate options in any other appropriate manner.

When the participant client device 108 receives a user input selection to view or retrieve the attachments (e.g., via the attachment execution icon 501), the participant client device 108 reads the attachment file from a local storage device or sends a request to a remote storage device to download the attachment file. Additionally, when the participant client device 108 receives a user input selection to accept the meeting (e.g., via the accept/decline execution icon 502), the participant client device 108 enters the meeting in a locally stored calendar or sends a request to the calendar server 201 or the scheduling server 202 to enter the meeting in a remotely stored calendar. When the participant client device 108 receives a user input selection to decline the meeting (e.g., via the accept/decline execution icon 502), the meeting is not stored in the calendar. Before the participant client device 108 receives either the accept or decline user input selection, the meeting may be shown as tentative. Additionally, the join execution icon 503 may not be visible or selectable until after the participant client device 108 receives the accept user input selection. Also, when the participant client device 108 receives a user input selection to join the meeting (e.g., via the join execution icon 503), the participant client device 108 sends a request (e.g., containing the meeting identifier, the dial-in number, and/or the passcode) to the conferencing server 203 to join the meeting. When the conferencing server 203 receives the request to join the meeting, the conferencing server 203 initiates the meeting and/or connects the participant client device 108 to the meeting or places the request on hold until the meeting starts. Execution of a meeting is further described below with respect to FIG. 12.

Figure 6:
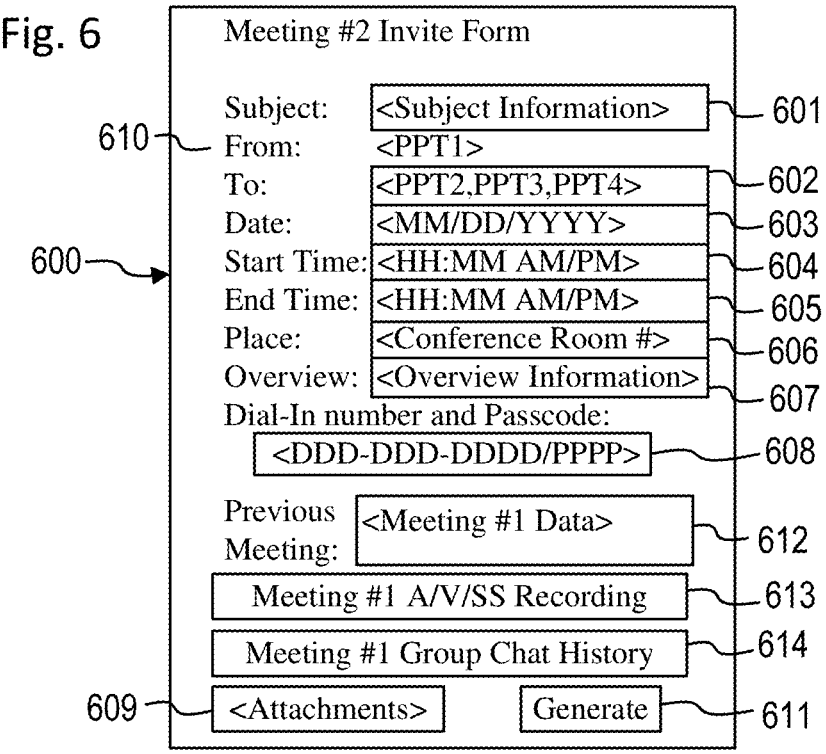
FIG. 6 is a simplified example invite form for use in scheduling a subsequent meeting, in accordance with some embodiments.

By comparison with the above described new meeting invite form, a subsequent follow-up meeting invite form not only generally allows for the organizer user to input data into various fields to define the follow-up meeting, but also is automatically initially populated by the organizer client device 107 or the scheduling server 202 with historical data retrieved from a record of the related previous meeting for some or all of the fields in accordance with specific rules for doing so. (The historical data or record of the previous meeting generally includes the subject, an identifier of the organizer, identifiers of other invitees, identifiers of attendees, a date/time, a location, overview information, a dial-in number, a passcode, attachments, and any other appropriate or available information.) The organizer user can then change any of the automatically populated entries in the fields. A variety of different formats for different combinations of the fields for a follow-up meeting invite form can be used. In general, the fields typically include most, if not all, of the same fields provided for the new meeting invite (e.g., for a subject, the invitees, a date/time, a location, an overview, a dial-in number, a passcode, and any attachments), but also include additional fields, execution icons, and/or menu options related to the previous meeting. FIG. 6 shows a simple non-limiting example of a subsequent follow-up meeting invite form (for a meeting #2) 600 having example fields for each of these types of data. Other embodiments may use other appropriate combinations of fields for a follow-up meeting invite form.

In this example, a subject field 601 (similar to the subject field 401) includes the general subject (as indicated by generic phrase "<Subject Information>") for the follow-up meeting, such as a project, task, or topic of discussion. The organizer client device 107 or the scheduling server 202 automatically initially populates the subject field 601 with the same subject read from the historical data of the previous meeting, since it is assumed that the follow-up discussion will involve the same subject. In some embodiments, additional information to indicate that this meeting is a follow-up meeting (e.g., a phrase such as "follow-up" or an incremented meeting number) is added to the subject by the organizer client device 107 or the scheduling server 202.

Also in this example, an invitee ("To") field 602 (similar to the invitee field 402) includes identifiers (e.g., email addresses, unique names, usernames, etc., as indicated by generic phrase "<PPT2,PPT3,PPT4>") of the invitees or intended participants (abbreviated "PPT") of the follow-up meeting. The organizer client device 107 or the scheduling server 202 automatically initially populates the invitee field 602 with the identifiers of the same invitees, participants or attendees read from the historical data of the previous meeting, since it is assumed that the follow-up discussion will involve the same participants.

Also in this example, a start date field 603 (similar to the date field 403) includes a month, day and year (as indicated by generic phrase "<MM/DD/YYYY>"), a start time field 604 (similar to the start time field 404) includes an hour, minute and AM or PM (as indicated by generic phrase "<HH:MM AM/PM>"), and an end time field 605 (similar to the end time field 405) includes an hour, minute and AM or PM (as indicated by generic phrase "<HH:MM AM/PM>"), for the follow-up meeting. (Alternatively, the date/time field(s) may include a start date, start time and length or a start date/time and end date/time or other appropriate combination of fields.) In some embodiments, the organizer client device 107 or the scheduling server 202 automatically initially populates the date/time fields 603, 604, 605 with the same date (as incremented by a week, month, quarter, etc.) and time read from the historical data of the previous meeting, since it is initially assumed that the previous meeting and the follow-up meeting may be regularly scheduled events that recur at regular intervals. In some embodiments, since the invitee field 602 is already initially populated, the organizer client device 107 or the scheduling server 202 immediately reads or requests the availability data for the organizer user and each of the invitees. In this case, the organizer client device 107 or the scheduling server 202 then automatically initially populates the date/time fields 603, 604, 605 with an appropriate recommended date and time (e.g., closest to a week, month, quarter, etc. after the previous meeting) or presents the organizer user with a menu allowing for selection among available dates and times. In some embodiments, automatic determination of the date and time (or recommendations for the date and time) also takes into consideration available conference rooms, as requested from the conferencing server 203.

Also in this example, a location ("Place") field 606 (similar to the location field 406) includes a physical location (as indicated by generic phrase "<Conference Room #>"), such as a conference room, where some or all of the attendees are to gather for the follow-up meeting. The location may be optional, since the new meeting could take place entirely by remote access via the client computing devices 107, 108, phone, video phone, and/or any other appropriate conference participation device. Additionally, multiple locations or location fields may be used if different attendees are to gather at different locations and connect via similar remote access. In some embodiments, the organizer client device 107 or the scheduling server 202 automatically initially populates the location field 606 with the same location read from the historical data of the previous meeting, since it is initially assumed that the follow-up meeting may be held at the same location.

Also in this example, an overview field 607 (similar to the overview field 407) generally includes any comments, descriptions or instructions for the invitees that are not provided in any of the other fields (as indicated by generic phrase "<Overview Information>"). In some embodiments, the organizer client device 107 or the scheduling server 202 automatically initially populates the overview field 607 with the same comments, descriptions or instructions read from the historical data of the previous meeting, since it is initially assumed that the follow-up meeting may need the same type of information.

Also in this example, a dial-in number and passcode field 608 (similar to the dial-in number and passcode field 408) includes a phone number, VOIP (voice over Internet Protocol) account, or other access indicator used for remote access for the new meeting and a meeting access code to be entered upon establishing a connection via the dial-in number to join the new meeting (as indicated by generic phrase "<DDD-DDD-DDDD/PPPP>"). In some embodiments, the organizer client device 107 or the scheduling server 202 automatically initially populates the dial-in number and passcode field 608 with the same dial-in number and passcode read from the historical data of the previous meeting, since it is initially assumed that the follow-up meeting may use the same data. Alternatively, the organizer client device 107 or the scheduling server 202 automatically initially populates the dial-in number and passcode field 608 with an available dial-in number and passcode read requested from the conferencing server 203.

Also in this example, an attachment field 609 (or execution icon) (similar to the attachment field 409) includes, or enables the inclusion or attachment of, various electronic documents, presentations or other electronic files to be shared or discussed during the meetings (as indicated by generic phrase "<Attachments>"). In some embodiments, the organizer client device 107 or the scheduling server 202 automatically initially populates the attachment field 609 with the same attachment data read from the historical data of the previous meeting, since it is initially assumed that the follow-up meeting may use the same attachments. Alternatively, if new or updated electronic documents, presentations or other electronic files were generated during the previous meeting, then the organizer client device 107 or the scheduling server 202 automatically initially populates the attachment field 609 with these files, since it may be assumed that the new files supersede the previous ones.

Also in this example, the follow-up meeting invite form 600 generally includes an organizer ("From") field 610 (similar to the organizer field 410) indicating an identifier of the organizer user (as indicated by generic phrase "<PPT1>"). However, this field is typically not changeable by the organizer user, except in some embodiments in which the organizer user is organizing the follow-up meeting on behalf of another user. Additionally, the organizer user of the follow-up meeting may be the same as or different from the organizer user of the previous meeting. If different, then the identifier of the follow-up meeting organizer user is included in the organizer field 610, and the identifier of the previous meeting organizer user is included in the invitee field 602 as one of the invitees.

Also in this example, the follow-up meeting invite form 600 generally includes a previous meeting field 612 showing the historical data for the previous meeting for comparison with the follow-up meeting by any of the invitees. In some embodiments, the organizer client device 107 or the scheduling server 202 automatically initially populates the previous meeting field 612 with the historical data of the previous meeting. Alternatively, an execution icon is used to receive a user input selection to request a presentation of the historical data in the record of the previous meeting.

Also in this example, the follow-up meeting invite form 600 generally includes one or more session recording fields, such as an audio/video/screen share (A/V/SS) recording field 613 and a messaging or group chat history field 614. The A/V/SS recording includes any audio, video and/or screen share recordings that were made of or during the previous meeting using a recording feature of the conferencing system 203. The group chat history includes any messages that were sent or received by any of the attendees of the previous meeting using a group chat feature of the conferencing system 203. In some embodiments, the organizer client device 107 or the scheduling server 202 automatically initially populates the session recording fields 613, 614 with locators (e.g., a URL accessible via the web server 105 to obtain the session recordings from the file server 104) for the A/V/SS recording and/or group chat history made for the previous meeting. Alternatively, the organizer client device 107 or the scheduling server 202 automatically initially attaches the A/V/SS recording and/or group chat history to the follow-up meeting invite form 600, which includes execution icons for accessing these session recordings.

When the organizer user views the follow-up meeting invite form 600, the organizer user only has to review the automatically populated data and simply make any needed changes, rather than having to generate a new meeting invite from beginning to end, as described above. Thus, the automatic population of the fields of the follow-up meeting invite form 600 enables an improved meeting scheduling process that coordinates information between related meetings to reduce the potential for errors in the scheduling process and to reduce the time involved in the scheduling process. The follow-up meeting invite is then generated and sent as described above for the new meeting invite, but including the additional/changed field entries, and/or additional/changed attachments.

Figure 7:
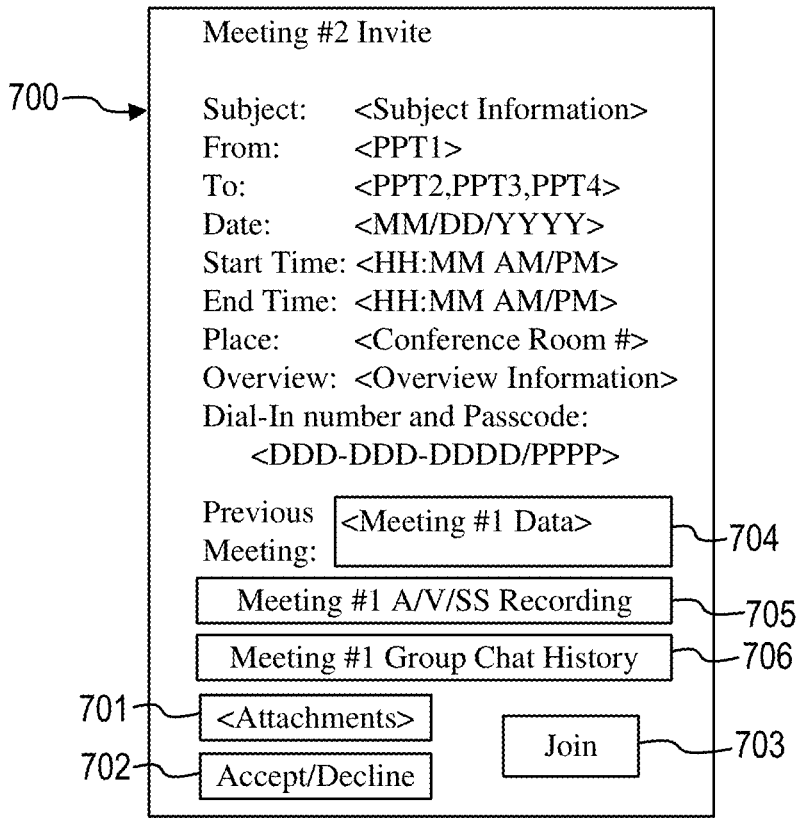
FIG. 7 is a simplified example meeting invite for use in scheduling a subsequent meeting, in accordance with some embodiments.

A variety of different formats for the follow-up meeting invite can be used. In general, similar to the new meeting invite, the follow-up meeting invite displays all of the meeting data that was automatically populated or changed in the fields described above. The follow-up meeting invite also generally allows for the participant users to view the follow-up meeting data, as well as provides options for the participant users to accept and/or decline the follow-up meeting, to download any attachments, to view or download the session recordings, and/or to join the meeting at the start date/time. FIG. 7 shows a simple non-limiting example of a follow-up meeting invite (for meeting #2) 700. The example follow-up meeting invite 700 includes the meeting data, such as the subject, the organizer user ("From"), the other invitees ("To"), the date/time, the location ("Place"), the overview, the dial-in number, and the passcode. The follow-up meeting invite 700 also includes means to download, retrieve or view the attachments (e.g., attachment execution icon 701, with function similar to 501), to accept or decline the meeting (e.g., accept/decline execution icon 702, with function similar to 502), to join the meeting (e.g., join execution icon 703, with function similar to 503), to view or access the historical data ("<Meeting #1 Data>") or the record of the previous meeting (e.g., previous meeting execution icon 704), to view or download the A/V/SS recording (e.g., meeting #1 A/V/SS recording execution icon 705), and to view or download the group chat history (e.g., meeting #1 group chat history execution icon 706). Other embodiments may display the follow-up meeting data and provide the appropriate options in any other appropriate manner.

Additionally, when the participant client device 108 receives a user input selection to view or retrieve the historical data or the record of the previous meeting (e.g., via the previous meeting execution icon 704), the participant client device 108 reads the historical data or record from a local storage device or sends a request to the calendar server 201 or the scheduling server 202 to download the historical data or record. When the participant client device 108 receives a user input selection to view or download the A/V/SS recording (e.g., via the meeting #1 A/V/SS recording execution icon 705), the participant client device 108 reads the A/V/SS recording from a local storage device or sends a request to the conferencing server 203 to download the A/V/SS recording. When the participant client device 108 receives a user input selection to view or download the group chat history (e.g., via the meeting #1 group chat history execution icon 706), the participant client device 108 reads the group chat history from a local storage device or sends a request to the conferencing server 203 to download the group chat history.

When the participant user views the follow-up meeting invite 700 via the participant client device 108, the participant user can select any of the execution icons 704, 705, 706 in order to review or become familiar with the content of the historical data or any of the session recordings of the previous meeting prior to the start of the follow-up meeting.

The inclusion of these options with the associated data or recordings directly in the follow-up meeting invite 700, therefore, enhances continuity between previous and subsequent meetings and increases efficiency in execution of the subsequent meeting, among other benefits, advantages and improvements.

By comparison with the above described new meeting invite form and follow-up meeting invite form, a subsequent forward-to meeting invite form not only generally allows for the organizer user to input data into various fields to define the forward-to meeting, but also is automatically initially populated by the organizer client device 107 or the scheduling server 202 with historical data retrieved from a record of the related previous meeting for some or all of the fields in accordance with specific rules for doing so. (The historical data or record of the previous meeting generally includes the subject, an identifier of the organizer, identifiers of other invitees, identifiers of attendees, a date/time, a location, overview information, a dial-in number, a passcode, attachments, and any other appropriate or available information.) The organizer user can then change any of the automatically populated entries in the fields. A variety of different formats for different combinations of the fields for a forward-to meeting invite form can be used. In general, the fields typically include most, if not all, of the same fields, execution icons, and/or menu options provided for the new meeting invite and/or the follow-up meeting invite (e.g., for a subject, the invitees, a date/time, a location, an overview, a dial-in number, a passcode, any attachments, previous meeting historical data, and any previous meeting session recordings), but with some variations in the fields or the manner in which the fields are automatically populated for the forward-to meeting. FIG. 8 shows a simple non-limiting example of a subsequent forward-to meeting invite form (for a meeting #2) 800 having example fields for each of these types of data. In this example, fields, execution icons or menu options 801-814 are generally similar in function to those of 601-614 described above. Other embodiments may use other appropriate combinations of fields for a follow-up meeting invite form.

In this example, the subject field 801 (similar to the subject field 601 or 401) includes the general subject (as indicated by generic phrase "<Subject Information>") for the forward-to meeting, such as a project, task, or topic of discussion. The organizer client device 107 or the scheduling server 202 automatically initially populates the subject field 801 with the same subject read from the historical data of the previous meeting, since it is assumed that the forward-to discussion will involve the same subject. In some embodiments, additional information to indicate that this meeting is a forward-to meeting (e.g., a phrase such as "forward-to meeting" or the like) is added to the subject by the organizer client device 107 or the scheduling server 202.

Also in this example, the invitee ("To") field 802 (similar to the invitee field 602 or 402) includes identifiers (e.g., email addresses, unique names, usernames, etc., as indicated by generic phrase "<PPT5,PPT6,PPT7>") of the invitees or intended participants (abbreviated "PPT") of the forward-to meeting. In some embodiments, the organizer client device 107 or the scheduling server 202 automatically initially populates the invitee field 802 with identifiers of invitees of the forward-to meeting based on the identifiers of the invitees/participants/attendees or the subject read from the historical data of the previous meeting, since it is assumed that the forward-to discussion will involve participants or invitees who have some type of relationship with the previous participants, attendees or invitees or with the subject of the previous meeting. Example techniques for selecting the invitees of the forward-to meeting are described below with reference to FIGS. 10 and 11. Additionally, in some embodiments, an optional previous invitee ("CC") field 815 includes the identifiers of the participants, attendees or invitees of the previous meeting, so that the invitees of the forward-to meeting can see who was invited to or attended the previous meeting, or the invitees of the previous meeting can receive the forward-to meeting invite and be aware that the forward-to meeting has been scheduled. There may also be some overlap between the invitees of the forward-to meeting and those of the previous meeting, e.g., the organizer user for the forward-to meeting may have been the organizer user or a participant of the previous meeting.

Also in this example, the start date field 803 (similar to the date field 603 or 403) includes a month, day and year (as indicated by generic phrase "<MM/DD/YYYY>"), a start time field 804 (similar to the start time field 604 or 404) includes an hour, minute and AM or PM (as indicated by generic phrase "<HH:MM AM/PM>"), and an end time field 805 (similar to the end time field 605 or 405) includes an hour, minute and AM or PM (as indicated by generic phrase "<HH:MM AM/PM>"), for the forward-to meeting. (Alternatively, the date/time field(s) may include a start date, start time and length or a start date/time and end date/time or other appropriate combination of fields.) In some embodiments, since the invitee field 802 is already initially populated, the organizer client device 107 or the scheduling server 202 immediately reads or requests the availability data for the organizer user and each of the invitees. In this case, the organizer client device 107 or the scheduling server 202 then automatically initially populates the date/time fields 803, 804, 805 with an appropriate recommended date and time or presents the organizer user with a menu allowing for selection among available dates and times. In some embodiments, automatic determination of the date and time (or recommendations for the date and time) also takes into consideration available conference rooms, as requested from the conferencing server 203.

Also in this example, the location ("Place") field 806 (similar to the location field 606 or 406) includes a physical location (as indicated by generic phrase "<Conference Room #>"), such as a conference room, where some or all of the attendees are to gather for the follow-up meeting. Other invitees may participate by remote access, so they do not need the location. Also, the location may be optional, since the new meeting could take place entirely by remote access via the client computing devices 107, 108, phone, video phone, and/or any other appropriate conference participation device. Additionally, multiple locations or location fields may be used if different attendees are to gather at different locations and connect via similar remote access. In some embodiments, the organizer client device 107 or the scheduling server 202 automatically initially populates the location field 806 with a location that is centrally located relative to one or more of the invitees, since it is initially assumed that the forward-to meeting may be held near the invitees of the forward-to meeting, rather than at the same location as the previous meeting.

Also in this example, the overview field 807 (similar to the overview field 607 or 407) generally includes any comments, descriptions or instructions for the invitees that are not provided in any of the other fields (as indicated by generic phrase "<Overview Information>"). In some embodiments, the organizer client device 107 or the scheduling server 202 automatically initially populates the overview field 807 with the same comments, descriptions or instructions read from the historical data of the previous meeting, since it is initially assumed that the forward-to meeting may need the same type of information.

Also in this example, the dial-in number and passcode field 808 (similar to the dial-in number and passcode field 608 or 408) includes a phone number, VOIP (voice over Internet Protocol) account, or other access indicator used for remote access for the new meeting and a meeting access code to be entered upon establishing a connection via the dial-in number to join the forward-to meeting (as indicated by generic phrase "<DDD-DDD-DDDD/PPPP>"). In some embodiments, the entry for the dial-in number and passcode field 808 is not automatically initially populated, but is left blank for the organizer user to fill in, since dial-in numbers may be assigned to particular individual users, so the participants in a forward-to meeting might not necessarily use the same dial-in number and passcode. However, in other embodiments, the organizer client device 107 or the scheduling server 202 automatically initially populates the dial-in number and passcode field 808 with the same dial-in number and passcode read from the historical data of the previous meeting, since it is an option to initially assume that the forward-to meeting may use the same data, although the organizer user can change it. Alternatively, the organizer client device 107 or the scheduling server 202 automatically initially populates the dial-in number and passcode field 808 with an available dial-in number and passcode requested from the conferencing server 203.

Also in this example, the attachment field 809 (or execution icon) (similar to the attachment field 609 or 409) includes, or enables the inclusion or attachment of, various electronic documents, presentations or other electronic files to be shared or discussed during the meetings (as indicated by generic phrase "<Attachments>"). In some embodiments, the organizer client device 107 or the scheduling server 202 automatically initially populates the attachment field 809 with the same attachment data read from the historical data of the previous meeting, since it is initially assumed that the forward-to meeting may use the same attachments for discussion. Alternatively, if new or updated electronic documents, presentations or other electronic files were generated during the previous meeting, then the organizer client device 107 or the scheduling server 202 automatically initially populates the attachment field 809 with these files, since it may be assumed that the new files supersede the previous ones.

Also in this example, the organizer ("From") field 810 (similar to the organizer field 610 or 410) includes an identifier of the organizer user (as indicated by generic phrase "<PPT1>"). However, this field is typically not changeable by the organizer user, except in some embodiments in which the organizer user is organizing the forward-to meeting on behalf of another user. Additionally, the organizer user of the forward-to meeting may be the same as or different from the organizer user of the previous meeting.

Also in this example, the previous meeting field 812 (similar to the previous meeting field 612) includes the historical data for the previous meeting for comparison with the forward-to meeting by any of the invitees. In some embodiments, the organizer client device 107 or the scheduling server 202 automatically initially populates the previous meeting field 812 with the historical data of the previous meeting. Alternatively, an execution icon is used to receive a user input selection to request a presentation of the historical data in the record of the previous meeting.

Also in this example, the follow-up meeting invite form 800 generally includes one or more session recording fields, such as the A/V/SS recording field 813 and the messaging or group chat history field 814 (similar to the A/V/SS recording field 613 and the messaging or group chat history field 614). The A/V/SS recording includes any audio, video and/or screen share recordings that were made of or during the previous meeting using a recording feature of the conferencing system 203. The group chat history includes any messages that were sent or received by any of the attendees of the previous meeting using a group chat feature of the conferencing system 203. In some embodiments, the organizer client device 107 or the scheduling server 202 automatically initially populates the session recording fields 813, 814 with locators (e.g., a URL accessible via the web server 105 to obtain the session recordings from the file server 104) for the A/V/SS recording and/or group chat history made for the previous meeting. Alternatively, the organizer client device 107 or the scheduling server 202 automatically initially attaches the A/V/SS recording and/or group chat history to the forward-to meeting invite form 800, which includes execution icons for accessing these session recordings.

When the organizer user views the forward-to meeting invite form 800, the organizer user only has to review the automatically populated data and simply make any needed changes, rather than having to generate a new meeting invite from beginning to end, as described above. Thus, the automatic population of the fields of the forward-to meeting invite form 800 enables an improved meeting scheduling process that coordinates information between related meetings to reduce the potential for errors in the scheduling process, to reduce the time involved in the scheduling process, and to consolidate information. The forward-to meeting invite is then generated and sent as described above for the new or follow-up meeting invites, including the additional/changed field entries, and/or additional/changed attachments.

A variety of different formats for the forward-to meeting invite can be used. In general, similar to the new or follow-up meeting invites, the forward-to meeting invite displays all of the meeting data that was automatically populated or changed in the fields described above. The forward-to meeting invite also generally allows for the participant users to view the forward-to meeting data, as well as provides options for the participant users to accept and/or decline the forward-to meeting, to download any attachments, to view or download the session recordings, and/or to join the meeting at the start date/time. FIG. 9 shows a simple non-limiting example of a forward-to meeting invite (for meeting #2) 900. The example forward-to meeting invite 900 includes the meeting data, such as the subject, the organizer user ("From"), the other invitees ("To"), the previous meeting invitees ("CC"), the date/time, the location ("Place"), the overview, the dial-in number, and the passcode. The forward-to meeting invite 900 also includes means to download, retrieve or view the attachments (e.g., attachment execution icon 901, with function similar to 701 or 501), to accept or decline the meeting (e.g., accept/decline execution icon 902, with function similar to 702 or 502), to join the meeting (e.g., join execution icon 903, with function similar to 703 or 503), to view or access the historical data ("<Meeting #1 Data>") or the record of the previous meeting (e.g., previous meeting execution icon 904, with function similar to 704), to view or download the A/V/SS recording (e.g., meeting #1 A/V/SS recording execution icon 905, with function similar to 705), and to view or download the group chat history (e.g., meeting #1 group chat history execution icon 906, with function similar to 706). Other embodiments may display the forward-to meeting data and provide the appropriate options in any other appropriate manner.

When the participant user views the forward-to meeting invite 900 via the participant client device 108, the participant user can select any of the execution icons 904, 905, 906, so that even a person who did not participate in the previous meeting can review or become familiar with the content of the historical data or any of the session recordings of the previous meetings prior to the start of the forward-to meeting. The inclusion of these options with the associated data or recordings directly in the forward-to meeting invite 900, therefore, enhances continuity between previous and subsequent meetings and increases efficiency in execution of the subsequent meeting, among other benefits, advantages and improvements.

Figure 10:
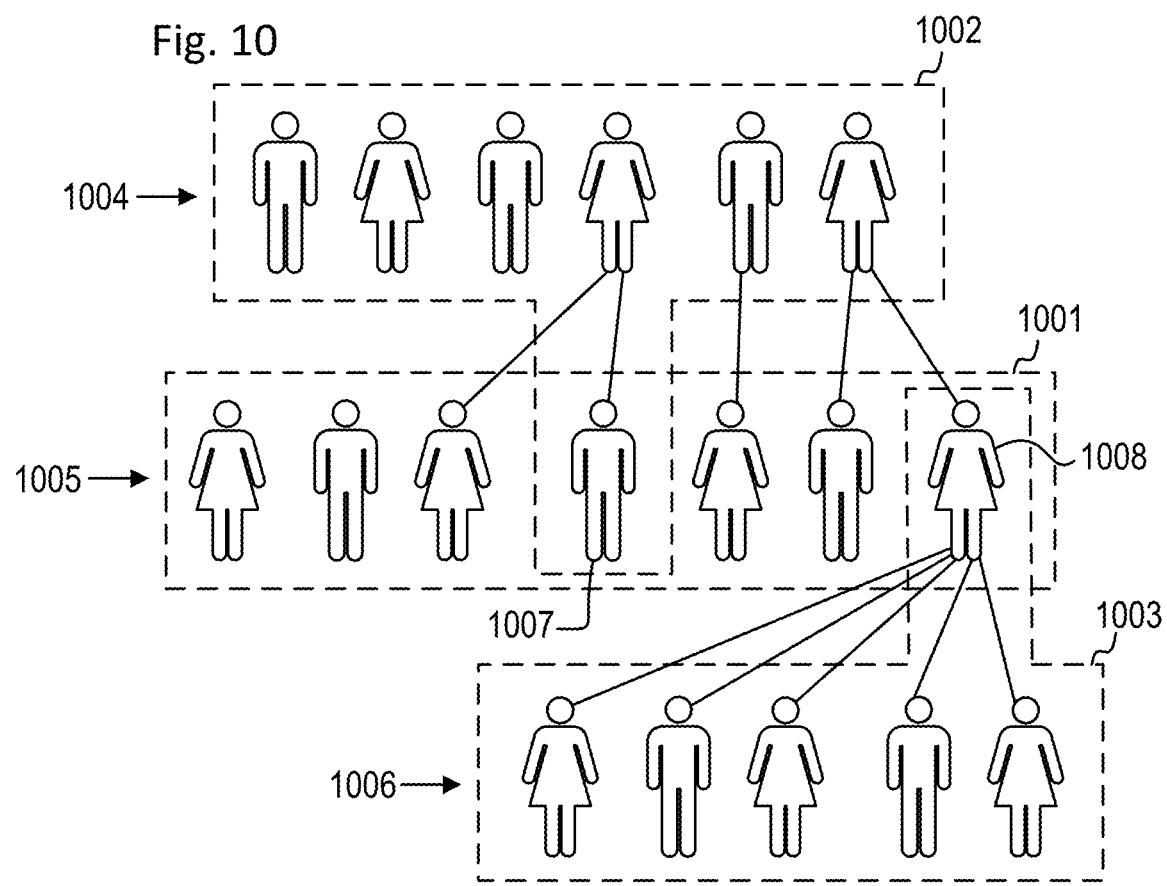
FIGS. 10 and 11 are simplified diagrams of example relationships between participants of previous and subsequent meetings, in accordance with some embodiments.

FIG. 10 illustrates non-limiting examples of relationships between a group of participants of a previous meeting 1001 and two groups of participants of forward-to meetings 1002, 1003 based on identifiers of the invitees, in accordance with some embodiments. The participants are arranged according to levels in a hierarchy of an enterprise, e.g., upper level 1004, middle level 1005, and lower level 1006. In some situations, for example, managers at the middle level 1005 in the enterprise may have a meeting to decide goals for their divisions for the next quarter. Once they reach a decision, however, they have to convey the results to a group of people in the upper level 1004, such as an executive team. The forward-to feature described herein, thus, enables one of the participants 1007 (at the middle level 1005) in the previous meeting 1001 to organize the forward-to meeting 1002 with the people in the upper level 1004, in a process which may also be referred to as a "forward-up" process.

In this example, the participant 1007 and some of the other people in the middle level 1005 are shown with lines to their supervisors in the upper level 1004. (Other people in the middle level 1005 without lines to supervisors may be examples of participants from outside the enterprise.) Therefore, when the participant 1007 (as the organizer user for the forward-to meeting 1002) enters a user input selection in the organizer client device 107 to schedule a forward-to meeting based on the previous meeting 1001, the organizer client device 107 (or the scheduling server 202) reads the hierarchy (which specifies links between identifiers for supervisors and their direct/indirect subordinates in the enterprise) from a local storage device or requests it from one of the servers 106, 201, 202, 203. Based on the hierarchy and the identifiers of the participants or invitees of the previous meeting 1001, the organizer client device 107 (or the scheduling server 202) selects the identifiers of the supervisors in the next higher level (i.e., the upper level 1004) as the identifiers for the invitees of the forward-to or forward-up meeting 1002. Additional invitees are shown selected from the same upper level 1004 in the hierarchy. Generation of the forward-to meeting invite 900 and the automatic population of the fields therein thus proceeds with the identifier of the participant 1007 and the selected identifiers.

In another example, which may also be referred to as a "forward-down" process, a participant 1008 of the previous meeting 1001 may need to convey the results of the previous meeting 1001 to the people whom the participant 1008 supervises. The participant 1008 in the middle level 1005 is shown with lines to subordinates in the lower level 1006. Therefore, when the participant 1008 (as the organizer user for the forward-to meeting 1003) enters a user input selection in the organizer client device 107 to schedule a forward-to meeting based on the previous meeting 1001, the organizer client device 107 (or the scheduling server 202) reads the hierarchy from a local storage device or requests it from one of the servers 106, 201, 202, 203. Based on the hierarchy and the identifier of the participant 1008, the organizer client device 107 (or the scheduling server 202) selects the identifiers of the subordinates in the next lower level (i.e., the lower level 1006) as the identifiers for the invitees of the forward-to or forward-down meeting 1003. Generation of the forward-to meeting invite 900 and the automatic population of the fields therein thus proceeds with the identifier of the participant 1008 and the selected identifiers.

Figure 11:
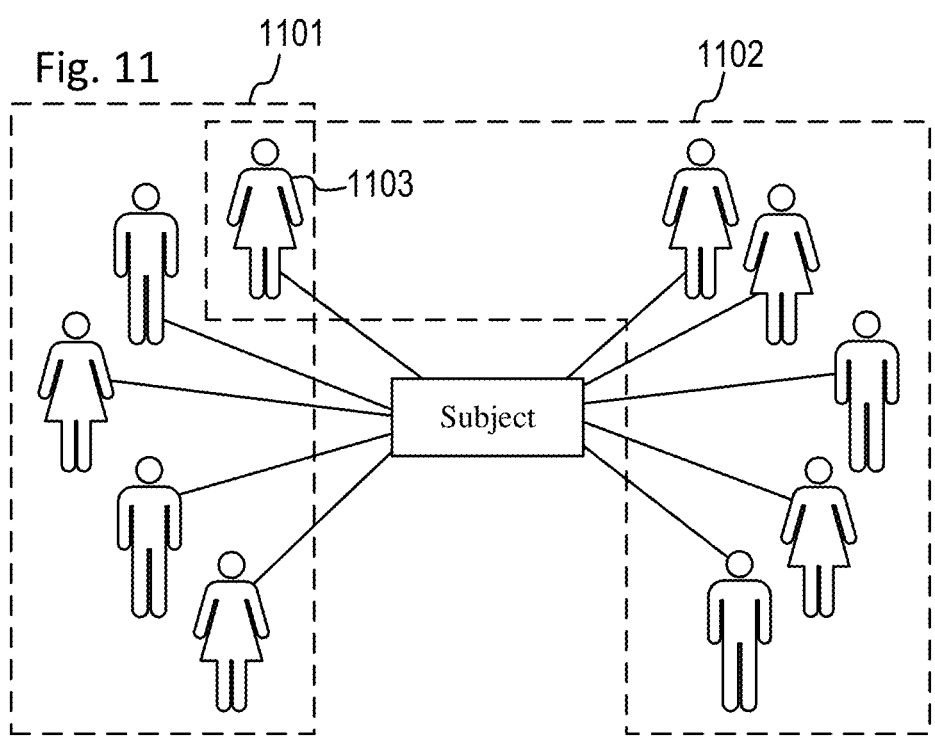

FIG. 11 illustrates an example in which participants of a previous meeting 1101 and of a forward-to meeting 1102 are associated with the same subject, e.g., project, task, topic of discussion, etc. For instance, the people of an electrical team, a mechanical team, and a marketing team may all be involved in the same project to bring a product to market. The result of the previous meeting 1101 (e.g., among a first team) may thus be of interest to the participants of the forward-to meeting 1102 (e.g., among a second team). Therefore, when a participant 1103 of the previous meeting 1101 (e.g., as a liaison between the two teams, and as the organizer user for the forward-to meeting 1102) enters a user input selection in the organizer client device 107 to schedule a forward-to meeting based on the previous meeting 1101, the organizer client device 107 (or the scheduling server 202) reads the subject (e.g., from the historical data or record) of the previous meeting 1101 from a local storage device or requests it from one of the servers 106, 201, 202, 203. The organizer client device 107 (or the scheduling server 202) also reads a list of subjects from a local storage device or requests it from one of the servers 106, 201, 202, 203. The list of subjects generally includes links between subjects and identifiers of members of teams involved in each subject. Based on the subject of the previous meeting 1101 and the links to the identifiers of members of another team (to which the participant 1103 is liaison) involved in the same subject in the list of subjects, the organizer client device 107 (or the scheduling server 202) selects the identifiers of the members of the other team as the identifiers for the invitees of the forward-to meeting 1102. Generation of the forward-to meeting invite 900 and the automatic population of the fields therein thus proceeds with the identifier of the participant 1103 and the selected identifiers.

Figure 12:
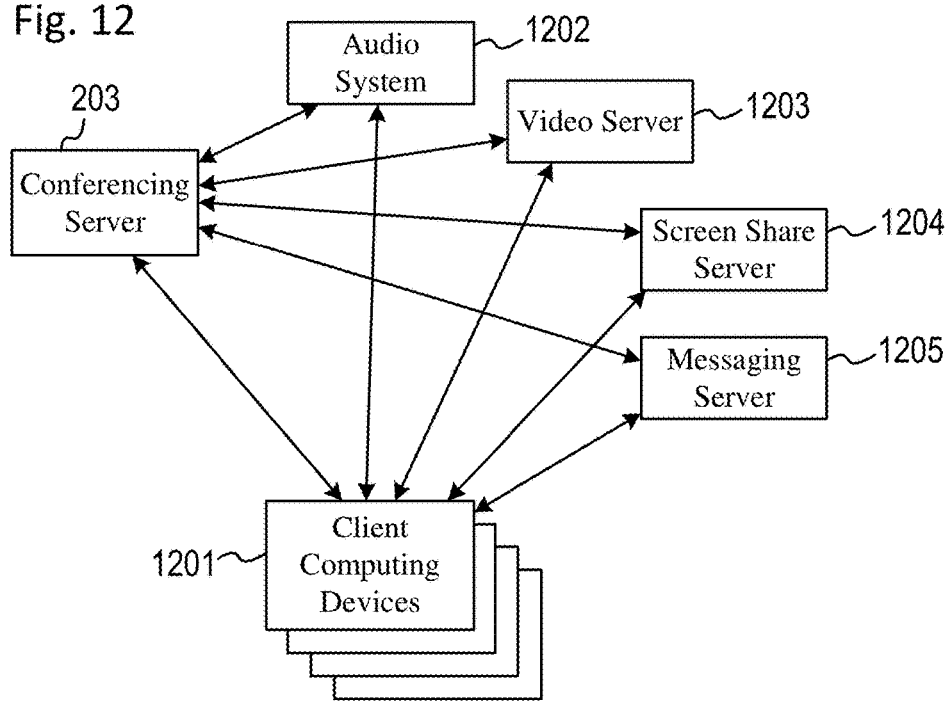
FIG. 12 is a simplified schematic diagram of an example portion of the meeting coordination system shown in FIG. 1 for executing a meeting, in accordance with some embodiments.

FIG. 12 shows a portion of the system 100 for executing a new or subsequent meeting, wherein the conferencing server 203 communicates with client computing devices 1201 and additional servers 1202, 1203, 1204, 1205. The client computing devices 1201 generally represent the organizer client device 107 and the participant client devices 108. The additional servers 1202, 1203, 1204, 1205 are part of the unified conference bridge 102 and include an audio system server 1202, a video server 1203, a screen share server 1204, and a messaging server 1205.

When the client computing devices 1201 receive the user input selection to join the meeting (e.g., via the join execution icon 503, 703, 903), the client computing devices 1201 sends a request (e.g., containing the meeting identifier, the dial-in number, and/or the passcode) to the conferencing server 203 to join the meeting. When the conferencing server 203 receives the request to join the meeting, and after the meeting has started, the conferencing server 203 establishes a channel for the client computing devices 1201 to the meeting by sending identifiers for the meeting and for the client computing devices 1201 to the servers 1202, 1203, 1204, 1205 and sending identifiers for the servers 1202, 1203, 1204, 1205 to the client computing devices 1201. The client computing devices 1201 then have a communication channel with the servers 1202, 1203, 1204, 1205 for audio, video, screen sharing, and messaging (i.e., group chat) during the meeting. Alternatively, communications between the client computing devices 1201 and the servers 1202, 1203, 1204, 1205 pass through the conferencing server 203, which acts as a gateway and synchronizes the various data.

The audio system server 1202 receives the audio packets from each client computing device 1201 and forwards them to the other client computing devices 1201, so that the participants can talk to each other in near real-time communication. The audio system server 1202 also records the audio from the client computing devices 1201 to form an audio recording portion of the A/V/SS recording of the session recording. The audio recording is stored in a local storage device or in the file server 104.

The video server 1203 receives video packets from each client computing device 1201 and forwards them to the other client computing devices 1201, so that the participants can see each other while talking in near real-time communication. The video server 1203 also records the video from the client computing devices 1201 to form a video recording portion of the A/V/SS recording of the session recording. The video recording is stored in a local storage device or in the file server 104.

The screen share server 1204 receives screen share packets from each client computing device 1201 and forwards them to the other client computing devices 1201, so that the participants can share screen presentations in near real-time communication. The screen share server 1204 also records the screen share data from the client computing devices 1201 to form a screen share recording portion of the A/V/SS recording of the session recording. The screen share recording is stored in a local storage device or in the file server 104.

The messaging server 1205 receives messages or group chat packets from each client computing device 1201 and forwards them to the other client computing devices 1201, so that the participants can share text messages in near real-time communication. The messaging server 1205 also records the messaging or group chat data from the client computing devices 1201 to form a messaging or group chat history or recording of the session recording. The messaging or group chat recording is stored in a local storage device or in the file server 104.

The audio recording, the video recording and the screen share recording are generally time synchronized and combined together to form the A/V/SS recording of the session recording, since they are all typically directly related to each other. The client computing devices 1201 can thus request (via the record of the meeting or the subsequent meeting invite) the A/V/SS recording in order to review or become familiar with the discussion in a previous meeting prior to the start of a subsequent meeting.

Figure 13:
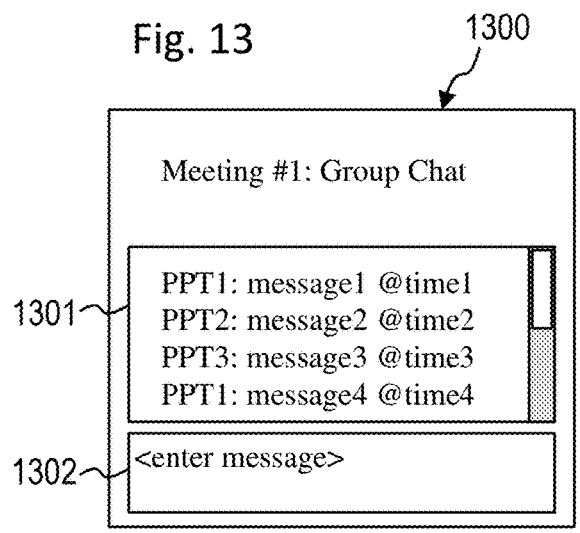
FIG. 13 is a simplified example messaging interface for use in a meeting, in accordance with some embodiments.
Figure 14:
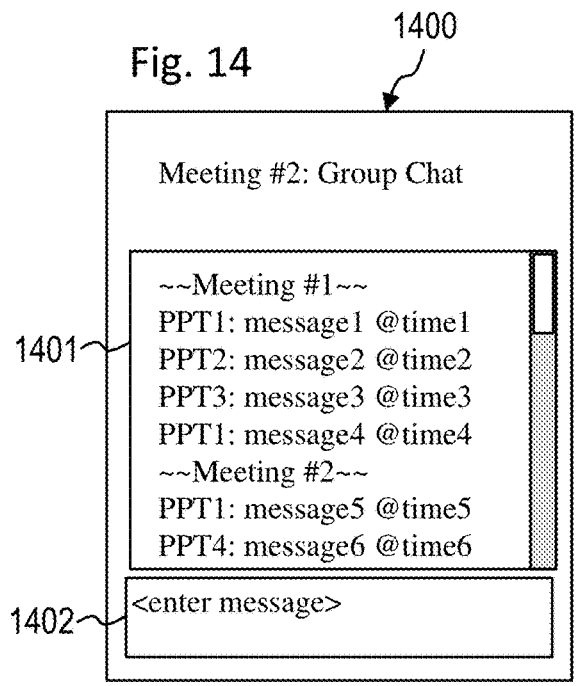
FIG. 14 is a simplified example messaging interface for use in a subsequent meeting, in accordance with some embodiments.

The messaging or group chat recording can also be time synchronized with the A/V/SS recording, but synchronization is not necessary. Additionally, in some embodiments, the messaging or group chat recording of the previous meeting is displayed through the client computing devices 1201 during the subsequent meeting, so that there appears to be a continuous group chat session. This continuous group chat session feature is illustrated by FIGS. 13 and 14. FIG. 13 illustrates a group chat session 1300 for a first or previous meeting ("Meeting #1"), showing messages 1301 received by the client computing device 1201 and a window 1302 for entering additional messages. FIG. 14, on the other hand, illustrates a group chat session 1400 for a subsequent meeting ("Meeting #2"), also showing messages 1401 received by the client computing device 1201 and a window 1402 for entering additional messages. However, the messages 1401 include not just the new messages for the subsequent meeting, but also the old messages from the previous meeting.

Figure 16:
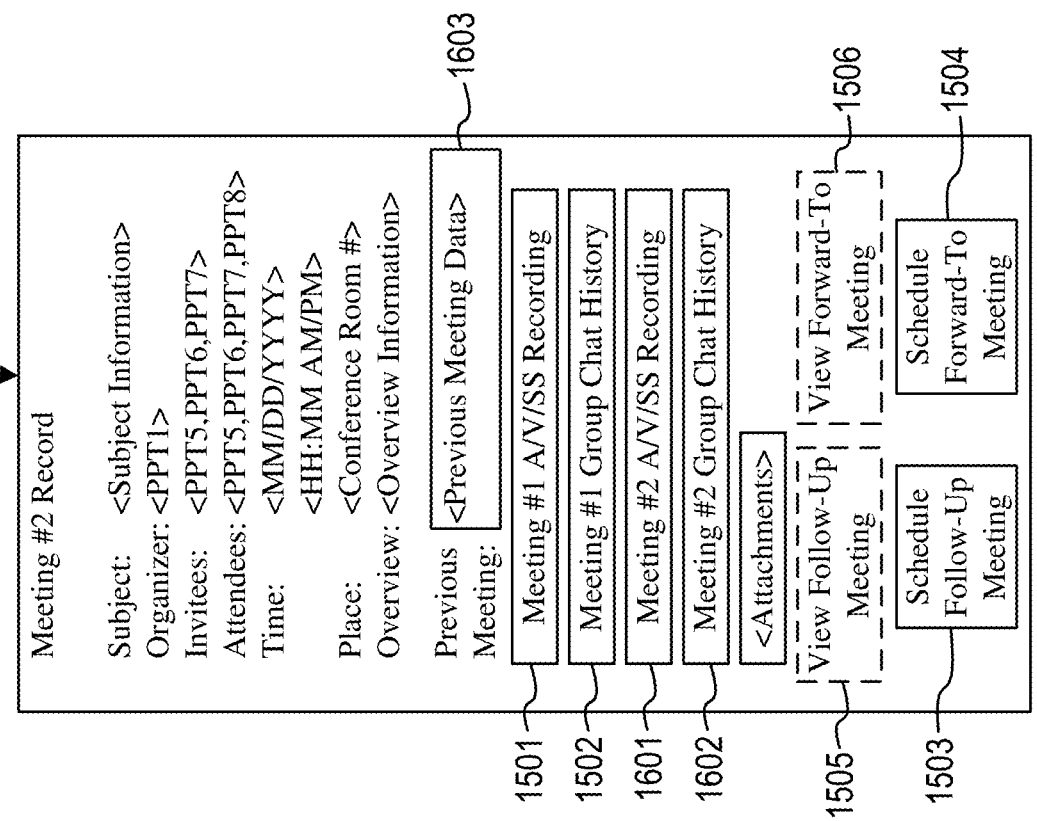
FIG. 16 is a simplified depiction of an example record of historical data for a subsequent meeting, in accordance with some embodiments.
Figure 15:
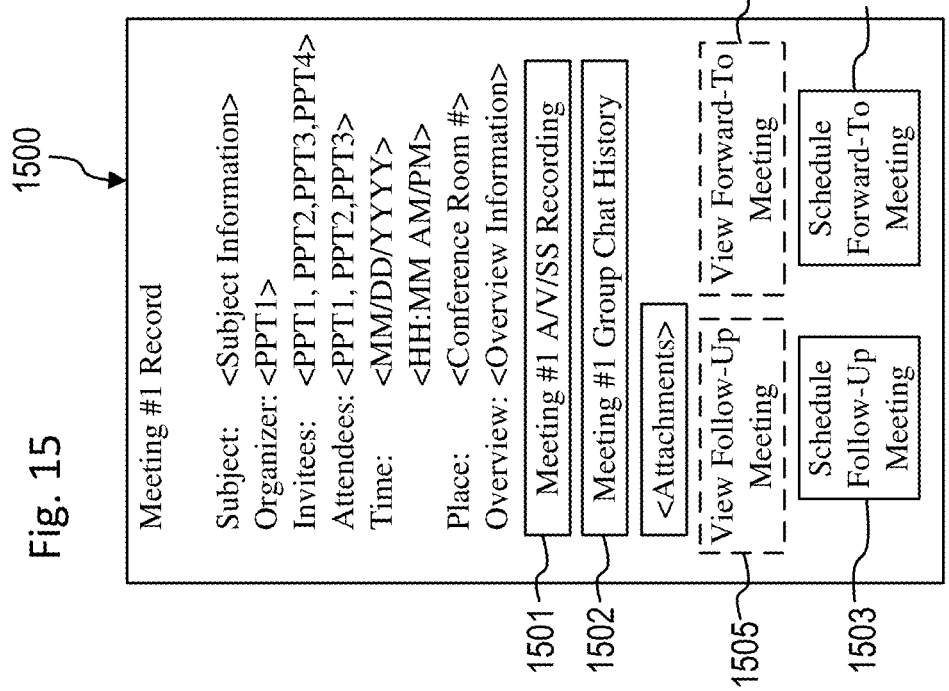
FIG. 15 is a simplified depiction of an example record of historical data for a meeting, in accordance with some embodiments.
Figure 24:
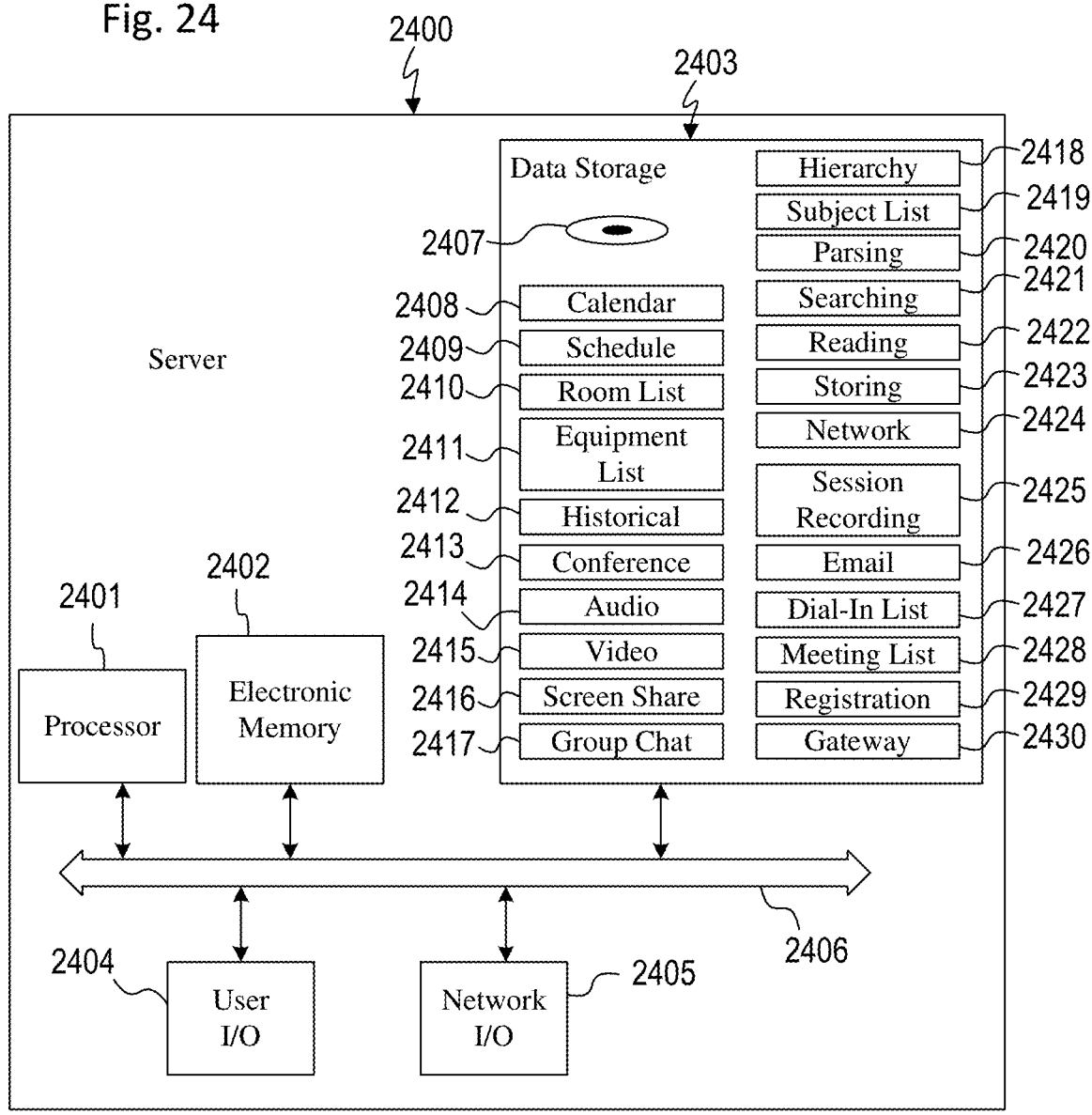
FIG. 24 is a simplified schematic diagram of one or more example servers for use in the meeting coordination system shown in FIG. 1, in accordance with some embodiments.

After a meeting is completed, the record of the meeting is stored by the calendar server 201. Any appropriate format for the meeting record may be used. In general, the meeting record includes the historical data (e.g., subject, organizer, invitees, attendees, date, time, location, overview, dial-in number, and passcode, some of which may be optional), the attachments (or links thereto), a link to any previous meeting, links to any subsequent meetings (a single previous meeting can have more than one subsequent meeting), and/or links to any session recordings. FIG. 15 shows a simple non-limiting example of a presentation interface for a meeting record 1500 for a meeting with no previous meeting. FIG. 16 shows a simple non-limiting example of a presentation interface for a meeting record 1600 for a subsequent meeting. Some of the historical data, if it is typically not needed upon a simple viewing of the record (such as the dial-in number and passcode in these examples), may be hidden when viewing the meeting record. However, such information is still present and can be used when generating a subsequent meeting.

Both meeting records 1500 and 1600 show most of the historical data. Also, both meeting records 1500 and 1600 show their respective session recordings (or execution icons for links thereto) for the A/V/SS recording 1501 and 1601 and the messaging or group chat history or recording 1502 and 1602. A user input selection of these recordings 1501, 1502, 1601, 1602 received by the client computing device 107, 108 results in the client computing device 107, 108 reading the recording 1501, 1502, 1601, 1602 from a local storage device or requesting it from the file server 104 via the web server 105.

The subsequent meeting record 1600 also shows the previous meeting, or an execution icon 1603 for a link to the record thereof, e.g., with function similar to that for the previous meeting execution icon 704, 904 in the subsequent meeting invite 700, 900. Additionally, the subsequent meeting record 1600 also shows the session recordings 1501, 1502 for the previous meeting; however, this is optional, since a user input selection of the previous meeting execution icon 1603 will cause the client computing device 107, 108 to present the previous meeting record 1500, from which the session recordings 1501, 1502 for the previous meeting can also be obtained.

Both meeting records 1500 and 1600 also show an execution icon 1503 for scheduling a follow-up meeting and an execution icon 1504 for scheduling a forward-to meeting. A user input selection of the follow-up meeting execution icon 1503 or the forward-to meeting execution icon 1504 generally has the same or similar effect as that for the follow-up meeting icon 302 and the forward-to meeting icon 303, respectively. The meeting record 1500 or 1600 thus provides the previous meeting historical data for the subsequent meeting invite form 600 or 800.

Both meeting records 1500 and 1600 also show an execution icon 1505 for viewing a record or invite of a follow-up meeting and an execution icon 1506 for viewing a record or invite of a forward-to meeting that was based on the meeting record 1500, 1600 for the previous meeting historical data. The execution icons 1505, 1506 are shown in dashed lines, since they are not active if the respective type of subsequent meeting has never been scheduled. However, if the subsequent meeting has been scheduled, but not executed, then a user input selection of the execution icon 1505, 1506 will cause the client computing device 107, 108 to present the subsequent meeting invite 700, 900. On the other hand, if the subsequent meeting has been executed, then a user input selection of the execution icon 1505, 1506 will cause the client computing device 107, 108 to present the subsequent meeting record, e.g., similar to 1600. Additionally, if a series of meetings are linked together, then the execution icons for viewing the subsequent meetings 1505, 1506 and the execution icon 1603 for viewing the previous meeting can be used to move back and forth between records of all of the meetings in the series.

FIG. 17 shows a simplified example process 1700 for the organizer client device 107 to schedule a new or subsequent meeting, in accordance with one or more example embodiments. The particular steps, combination of steps, and order of the steps are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

Upon starting, the organizer client device 107 displays (at 1701) a user interface (UI) with which the type of the meeting (e.g., new, follow-up, or forward-to) can be selected, such as with a typical calendar UI, a specialized meeting schedule interface (e.g., 300), or a previous meeting record (e.g., 1500, 1600). At 1702, the organizer client device 107 receives the meeting type selection, e.g., by receiving a user input selection of a new or subsequent meeting execution icon and/or a menu (e.g., 301, 302, 303, 304, 1503, 1504).

If the meeting type selected at 1702 is a new meeting, then the organizer client device 107 displays (at 1703) a new meeting invite form (e.g., 400). At 1704, the organizer client device 107 receives the user input additions to the various fields of the new meeting invite form, as described above. At 1705, the organizer client device 107 sends a request to the conferencing server 203 to register the meeting and obtain a meeting ID, a dial-in number, and a participant code (i.e., a passcode). Upon receiving this request, the conferencing server 203 responds by generating the meeting ID and selecting an available dial-in number and passcode combination. The conferencing server 203 then transmits this information back to the organizer client device 107, which receives the information and enters it into the appropriate fields in the meeting invite form. At 1706, upon receiving a user input selection to generate and send the new meeting invite, the organizer client device 107 sends (or requests the scheduling server 202 to send) the new meeting invite to the participant client devices 108 according to the identifiers of the invitees in the new meeting invite.

If the meeting type selected at 1702 is a follow-up meeting, then the organizer client device 107 displays (at 1707) a follow-up meeting invite form (e.g., 600) to schedule a subsequent follow-up meeting related to a previous meeting that has already been held and for which a session recording has been generated by a conferencing system (e.g., 102) and stored in a storage system (e.g., 104). The organizer client device 107 also receives (at 1708) a user input selection of the past or previous meeting on which to base the follow-up meeting. At 1709, the organizer client device 107 reads the historical data or record of the previous meeting from a local storage device or requests and receives it from the appropriate server 201, 202, 203 that maintains this information. At 1710, the organizer client device 107 reads the session recording of the previous meeting from a local storage device or requests and receives it from the file server 104. At 1711, the organizer client device 107 automatically populates the various fields of the follow-up meeting invite form without additional user input, as described above. At 1712, the organizer client device 107 receives the user input changes to (e.g., additions to and/or deletions from) the various fields of the follow-up meeting invite form, as described above. At 1713, the organizer client device 107 sends a request to the conferencing server 203 to register the follow-up meeting, e.g., as a continuation of the previous meeting, so that the same meeting ID, dial-in number, and passcode can be used for the follow-up meeting. (Alternatively, the organizer client device 107 sends a request to the conferencing server 203 to register the meeting and obtain a meeting ID, a dial-in number, and a passcode, as at 1705.) Upon receiving this request, the conferencing server 203 responds by registering the follow-up meeting and linking it to the previous meeting. The conferencing server 203 then transmits a registration confirmation back to the organizer client device 107. At 1706, upon receiving a user input selection to generate and send the follow-up meeting invite, the organizer client device 107 sends (or requests the scheduling server 202 to send) the follow-up meeting invite to the participant client devices 108 according to the identifiers of the invitees in the follow-up meeting invite.

If the meeting type selected at 1702 is a forward-to meeting, then the organizer client device 107 displays (at 1714) a forward-to meeting invite form (e.g., 800) to schedule a subsequent forward-to meeting related to a previous meeting that has already been held and for which a session recording has been generated by a conferencing system (e.g., 102) and stored in a storage system (e.g., 104). The organizer client device 107 also receives (at 1715) a user input selection of the past or previous meeting on which to base the forward-to meeting. At 1716, the organizer client device 107 reads the historical data or record of the previous meeting from a local storage device or requests and receives it from the appropriate server 201, 202, 203 that maintains this information. At 1717, the organizer client device 107 reads the session recording of the previous meeting from a local storage device or requests and receives it from the file server 104. At 1718, the organizer client device 107 automatically populates the various fields of the forward-to meeting invite form without additional user input, as described above. At 1719, the organizer client device 107 receives the user input changes to (e.g., additions to and/or deletions from) the various fields of the forward-to meeting invite form, as described above. At 1705, the organizer client device 107 sends a request to the conferencing server 203 to register the meeting and obtain a meeting ID, a dial-in number, and a participant code (i.e., a passcode). Upon receiving this request, the conferencing server 203 responds by generating the meeting ID and selecting an available dial-in number and passcode combination. The conferencing server 203 then transmits this information back to the organizer client device 107, which receives the information and enters it into the appropriate fields in the meeting invite form. At 1706, upon receiving a user input selection to generate and send the forward-to meeting invite, the organizer client device 107 sends (or requests the scheduling server 202 to send) the forward-to meeting invite to the participant client devices 108 according to the identifiers of the invitees in the forward-to meeting invite.

FIG. 18 shows a simplified example process 1800 for the servers 104, 105, 106, 201, 202, 203 of the system 100 to assist in scheduling a subsequent meeting, in accordance with one or more example embodiments. The particular steps, combination of steps, and order of the steps are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

Upon starting, the server 106, 201, or 202 receives (at 1801) from the organizer client device 107 a request for the historical data or record of a previous meeting that has already been held and for which a session recording has been generated by a conferencing system (e.g., 102) and stored in a storage system (e.g., 104). The server 106, 201, or 202 responds to the request by reading the historical data or record of the previous meeting from a local storage device or a database (e.g., 103) and transmitting this data back to the organizer client device 107. At 1802, the server 104, 105, 202, or 203 receives from the organizer client device 107 a request for the session recording of the previous meeting, including the A/V/SS recording and the messaging or group chat history or recording. The server 104, 105, 202, or 203 responds to the request by reading the session recording of the previous meeting from a local storage device or a storage system (e.g., 104) and transmitting this data back to the organizer client device 107. At 1803, the conferencing server 203 receives from the organizer client device 107 a request to register a meeting and obtain a meeting ID, a dial-in number, and a passcode and/or a request to register the subsequent meeting and link it with the previous meeting. The conferencing server 203 responds to the request by generating the meeting ID and selecting an available dial-in number and passcode combination. The conferencing server 203 then transmits this information back to the organizer client device 107. Alternatively, the conferencing server 203 responds to the request by registering the subsequent meeting and linking it to the previous meeting. The conferencing server 203 then transmits a registration confirmation back to the organizer client device 107. At 1804, the server 106 or 202 receives and forwards (i.e., transmits) the subsequent meeting invite (e.g., 700 or 900) to the participant client devices 108.

FIG. 19 shows a simplified example process 1900 for the client computing devices 107, 108 to receive a new meeting invite and participate in the new meeting, in accordance with one or more example embodiments. The particular steps, combination of steps, and order of the steps are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

Upon starting, the participant client device 108 receives (at 1901) a new meeting invite (e.g., 500). The participant client device 108 also displays the invite to a participant user and receives a user input selection to accept the invite. (The organizer client device 107 skips 1901, since it already has the invite.) At 1902, at or near the start time of the new meeting, the client computing device 107, 108 sends a request to the conferencing server 203 to initiate (if the new meeting has not started yet) or to join (if the new meeting has already started) the new meeting with audio, video, screen share, and messaging functionalities activated. At 1903, if the user so desires, the client computing device 107, 108 receives a user input selection to record the session and responds by sending a request to the conferencing server 203 to record the session. After the meeting, and if the user so desires, the client computing device 107, 108 receives a user input selection to access the session recording and responds by sending a request (at 1904) to the server 104, 105, 202, or 203 for the session recording. Upon receiving the session recording, the client computing device 107, 108 stores and/or presents the session recording.

FIG. 20 shows a simplified example process 2000 for the client computing devices 107, 108 to receive a follow-up meeting invite and participate in the follow-up meeting, in accordance with one or more example embodiments. The particular steps, combination of steps, and order of the steps are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

Upon starting, the participant client device 108 receives (at 2001) a follow-up meeting invite (e.g., 700). The participant client device 108 also displays the invite to a participant user and receives a user input selection to accept the invite. (The organizer client device 107 skips 2001, since it already has the invite.) At 2002, if the user so desires, the client computing device 107, 108 receives a user input selection to access the session recording of the previous meeting. The client computing device 107, 108 responds by reading the session recording from a local storage device or sending a request to the server 104, 105, 202, or 203 for the session recording. Upon receiving the session recording from the server 104, 105, 202, or 203, the client computing device 107, 108 stores and then displays or presents (at 2003) the session recording for the user to review or become familiar with the discussion and messages in the previous meeting at any time prior to the start of the follow-up meeting. At 2004, at or near the start time of the follow-up meeting, the client computing device 107, 108 sends a request to the conferencing server 203 to initiate (if the follow-up meeting has not started yet) or to join (if the follow-up meeting has already started) the follow-up meeting with audio, video, screen share, and messaging functionalities activated. At 2005, the client computing device 107, 108 displays the group chat history of the previous meeting, so that the group chat can proceed as if the follow-up group chat session continues from the previous group chat session (e.g., as illustrated by the group chat session 1400). At 2006, if the user so desires, the client computing device 107, 108 receives a user input selection to record the session and responds by sending a request to the conferencing server 203 to record the session. After the meeting, and if the user so desires, the client computing device 107, 108 receives a user input selection to access the session recording and responds by sending a request (at 2007) to the server 104, 105, 202, or 203 for the session recording. Upon receiving the session recording, the client computing device 107, 108 stores and/or presents the session recording.

FIG. 21 shows a simplified example process 2100 for the client computing devices 107, 108 to receive a forward-to meeting invite and participate in the forward-to meeting, in accordance with one or more example embodiments. The particular steps, combination of steps, and order of the steps are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

Upon starting, the participant client device 108 receives (at 2101) a forward-to meeting invite (e.g., 900). The participant client device 108 also displays the invite to a participant user and receives a user input selection to accept the invite. (The organizer client device 107 skips 2101, since it already has the invite.) At 2102, if the user so desires, the client computing device 107, 108 receives a user input selection to access the session recording of the previous meeting. The client computing device 107, 108 responds by reading the session recording from a local storage device or sending a request to the server 104, 105, 202, or 203 for the session recording. Upon receiving the session recording from the server 104, 105, 202, or 203, the client computing device 107, 108 stores and then displays or presents (at 2103) the session recording for the user to review or become familiar with the discussion and messages in the previous meeting at any time prior to the start of the forward-to meeting. At 2104, at or near the start time of the forward-to meeting, the client computing device 107, 108 sends a request to the conferencing server 203 to initiate (if the forward-to meeting has not started yet) or to join (if the forward-to meeting has already started) the forward-to meeting with audio, video, screen share, and messaging functionalities activated. At 2105, if the user so desires, the client computing device 107, 108 receives a user input selection to record the session and responds by sending a request to the conferencing server 203 to record the session. After the meeting, and if the user so desires, the client computing device 107, 108 receives a user input selection to access the session recording and responds by sending a request (at 2106) to the server 104, 105, 202, or 203 for the session recording. Upon receiving the session recording, the client computing device 107, 108 stores and/or presents the session recording.

FIG. 22 shows a simplified example process 2200 for the servers 203, 1202, 1203, 1204, 1205 to coordinate execution of a new or subsequent meeting, in accordance with one or more example embodiments. The particular steps, combination of steps, and order of the steps are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps.

Upon starting, the conferencing server 203 receives (at 2201) requests from the client computing devices 107, 108 to initiate and/or to join the meeting. The conferencing server 203 also receives (at 2202) from each client computing device 107, 108 data that identifies the participants or the client computing devices 107, 108. At 2203 the conferencing server 203 establishes communication channels with each of the client computing devices 107, 108 and the servers 1202, 1203, 1204, 1205. If the meeting is linked with a previous meeting (as determined at 2204), then the server 203 or 1205 requests and receives (at 2205) the previous recorded group chat history from the storage system (e.g., 104), so that the previous recorded group chat data is appended to the new group chat data for the meeting (e.g., as illustrated by the group chat session 1400). At 2206, the servers 203, 1202, 1203, 1204, 1205 receive the audio, video, screen share, and messaging data from each client computing device 107, 108 and forward this data to the other client computing devices 107, 108, so that the meeting session is properly executed. At any time before or during the meeting, one or more of the servers 203, 1202, 1203, 1204, 1205 receive (at 2207) a request from one or more of the client computing devices 107, 108 to record the session. At 2208, the servers 203, 1202, 1203, 1204, 1205 store the various portions of the session recording in the storage system (e.g., 104).

A simplified schematic diagram showing an example client computing device 2300 (representing the client computing devices 107, 108) is shown in FIG. 23, in accordance with some embodiments. Other embodiments may use other components and combinations of components. For example, the client computing device 2300 may represent a computer workstation, desktop computer, notebook computer, tablet computer, smart phone, cell phone, personal digital assistant, voice over Internet protocol (VoIP) phone, video phone, land line phone, smart watch, smart car, game console, etc. In the illustrated embodiment, the client computing device 2300 generally includes at least one processor 2301, a main electronic memory 2302, a data storage 2303, a user I/O 2304, and a network I/O 2305, among other components not shown for simplicity, connected or coupled together by a data communication subsystem 2306.

The processor 2301 represents one or more central processing units on one or more PCBs (printed circuit boards). When executing computer-executable instructions for performing the above described functions of the client computing device 2300 in cooperation with the main electronic memory 2302, the processor 2301 becomes a special purpose computer for performing the functions of the instructions.

The main electronic memory 2302 represents one or more RAM modules on one or more PCBs in one or more housings or enclosures. In some embodiments, the main electronic memory 2302 represents multiple memory module units. In operation with the processor 2301, the main electronic memory 2302 stores the computer-executable instructions executed by, and data processed by, the processor 2301 to perform the above described functions of the client computing device 2300.

The data storage 2303 represents or comprises any appropriate number or combination of internal or external physical mass storage devices, such as hard drives, optical drives, network-attached storage (NAS) devices, flash drives, etc. The data storage 2303 generally provides persistent storage (e.g., in a non-transitory computer readable medium 2307) for the programs (e.g., computer-executable instructions) and data used in operation of the processor 2301 and the main electronic memory 2302, such as, but not limited to, a calendar routine 2308 for maintaining and presenting calendar and meeting data, a schedule routine 2309 for scheduling new and subsequent meetings and generating and responding to meeting invites, new invite data 2310 including meeting data for new meetings, subsequent invite data 2311 including meeting data for subsequent meetings, historical data 2312 of previous meetings used to generate meeting invites for subsequent meetings, a conference routine 2313 for coordinating participation in conferences, an audio routine 2314 for handling the incoming and outgoing data for the audio portions of conferences, a video routine 2315 for handling the incoming and outgoing data for the video portions of conferences, a screen share routine 2316 for handling the incoming and outgoing data for the screen share portions of conferences, a group chat routine 2317 for handling the incoming and outgoing data for the group chat portions of conferences, hierarchy data 2318 including hierarchical data with links between identifiers of users for organizational charts for use in selecting forward-to meeting invitees, subject list data 2319 including links between subjects and identifiers of users for use in selecting forward-to meeting invitees, one or more parsing routines 2320 for parsing data in previous meeting records to generate data for subsequent meeting invites, a searching routine 2321 for searching through the various types of data for the relevant data for generating meeting invites, a reading routine 2322 for reading data from the data storage 2303 into the main electronic memory 2302, a storing routine 2323 for storing data from the main electronic memory 2302 to the data storage 2303, a network communication program 2324 for sending and receiving network communication packets through the network 109, session recording data 2325 including the A/V/SS recording and the messaging or group chat history or recording for presentation to a user, and an email routine 2326 for sending and receiving emails and invites, among others. Under control of these programs/routines and using this data, the processor 2301, in cooperation with the main electronic memory 2302, performs the above described functions for the client computing device 2300.

The user I/O 2304 represents one or more appropriate user interface devices, such as keyboards, pointing devices, displays, audio devices, etc. An organizer or participant user, for example, may use these devices to access, setup and control the client computing device 2300 to generate or respond to a meeting invite, review session recordings of previous meetings, and participate in new and subsequent meetings, among other activities.

The network I/O 2305 represents any appropriate networking devices, such as network adapters, etc. for communicating through the network 109. The client computing device 2300 communicates with the system 100 through the network I/O 2305 to request data, send and receive invites, and participate in new and subsequent meetings, among other activities to perform the above described functions of the client computing device 2300.

The data communication subsystem 2306 represents any appropriate communication hardware for connecting the other components in a single unit or in a distributed manner on one or more PCBs.

A simplified schematic diagram showing an example server 2400 (representing any combination of one or more of the servers 104, 105, 106, 201, 202, 203, 1202, 1203, 1204, 1205) for use in the system 100 is shown in FIG. 2400, in accordance with some embodiments. Other embodiments may use other components and combinations of components. For example, the server 2400 may represent one or more physical computer devices or servers, such as web servers, rack-mounted computers, network storage devices, desktop computers, laptop/notebook computers, etc., depending on the complexity of the system 100. In some embodiments implemented at least partially in a cloud network potentially with data synchronized across multiple geolocations, the server 2400 may be referred to as one or more cloud servers. In some embodiments, the functions of the server 2400 are enabled in a single computer device. In more complex implementations, some of the functions of the computing system 1100 are distributed across multiple computer devices, whether within a single server farm facility or multiple physical locations. In some embodiments wherein the server 2400 represents multiple computer devices, some of the functions of the server 2400 are implemented in some of the computer devices, while other functions are implemented in other computer devices. In the illustrated embodiment, the server 2400 generally includes at least one processor 2401, a main electronic memory 2402, a data storage 2403, a user I/O 2404, and a network I/O 2405, among other components not shown for simplicity, connected or coupled together by a data communication subsystem 2406.

The processor 2401 represents one or more central processing units on one or more PCBs in one or more housings or enclosures. In some embodiments, the processor 2401 represents multiple microprocessor units in multiple computer devices at multiple physical locations interconnected by one or more data channels, such as the network 109. When executing computer-executable instructions for performing the above described functions of the server 2400 in cooperation with the main electronic memory 2402, the processor 2401 becomes a special purpose computer for performing the functions of the instructions.

The main electronic memory 2402 represents one or more RAM modules on one or more PCBs in one or more housings or enclosures. In some embodiments, the main electronic memory 2402 represents multiple memory module units in multiple computer devices at multiple physical locations. In operation with the processor 2401, the main electronic memory 2402 stores the computer-executable instructions executed by, and data processed by, the processor 2401 to perform the above described functions of the server 2400.

The data storage 2403 represents or comprises any appropriate number or combination of internal or external physical mass storage devices, such as hard drives, optical drives, network-attached storage (NAS) devices, flash drives, etc. In some embodiments, the data storage 2403 represents multiple mass storage devices in multiple computer devices at multiple physical locations. The data storage 2403 generally provides persistent storage (e.g., in a non-transitory computer readable medium 2407) for the programs (e.g., computer-executable instructions) and data used in operation of the processor 2401 and the main electronic memory 2402, such as, but not limited to, a calendar services program 2308 for maintaining and providing calendar and meeting data for users of the system 100, a schedule services program 2409 for coordinating the scheduling of new and subsequent meetings and generating the meeting invites, a list of conference rooms 2410 including the locations and availability of conference rooms that can be reserved for meetings, a list of conference equipment resources 2411 including the current location and availability of the equipment that can be used in meetings, historical data 2412 of previous meetings used to generate meeting invites for subsequent meetings, a conference services program 2313 for coordinating participation in conferences by multiple users of the system 100, an audio services program 2414 for receiving and forwarding data for the audio portions of conferences, a video services program 2415 for receiving and forwarding data for the video portions of conferences, a screen share services program 2416 for receiving and forwarding data for the screen share portions of conferences, a group chat services program 2417 for receiving and forwarding data for the group chat portions of conferences, hierarchy data 2418 including hierarchical data with links between identifiers of users for organizational charts for use in selecting forward-to meeting invitees, subject list data 2419 including links between subjects and identifiers of users for use in selecting forward-to meeting invitees, one or more parsing routines 2420 for parsing data in meeting invites, a searching routine 2421 for searching through the various types of data for the relevant data to be sent to the client computing devices 107 and 108, a reading routine 2422 for reading data from the data storage 2403 into the main electronic memory 2402, a storing routine 2423 for storing data from the main electronic memory 2402 to the data storage 2403, a network communication services program 2424 for sending and receiving network communication packets through the network 109, session recording data 2425 including the A/V/SS recordings and the messaging or group chat histories or recordings for completed meetings, an email services program 2426 for maintaining and handling emails and invites between the client computing devices 107 and 108, a list of dial-in numbers 2427 including passcodes and reservations and availability for each number, list of meetings 2428 including dates/times/locations/resources reserved for each, a registration services program 2429 for registering meetings into the system 100 and generating meeting IDs, a gateway services program 2430 for serving as a gateway to pass messages and other data between servers and client computing devices, among others. Under control of these programs and using this data, the processor 2401, in cooperation with the main electronic memory 2402, performs the above described functions for the server 2400.

The user I/O 2404 represents one or more appropriate user interface devices, such as keyboards, pointing devices, displays, etc. In some embodiments, the user I/O 2404 represents multiple user interface devices for multiple computer devices at multiple physical locations. A system administrator, for example, may use these devices to access, setup and control the server 2400.

The network I/O 2405 represents any appropriate networking devices, such as network adapters, etc. for communicating through the network 109. In some embodiments, the network I/O 2405 represents multiple such networking devices for multiple computer devices at multiple physical locations for communicating through multiple data channels. The client computing devices 107, 108 communicate with the server 2400 through the network I/O 2405 to send and receive emails, to submit meeting data requests and meeting invites, and to participate in the meetings. The different servers 104, 105, 106, 201, 202, 203, 1202, 1203, 1204, 1205 communicate with each other through the network I/O 2405 of each server to perform the above described functions of the system 100.

The data communication subsystem 2406 represents any appropriate communication hardware for connecting the other components in a single unit or in a distributed manner on one or more PCBs, within one or more housings or enclosures, within one or more rack assemblies, etc.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:
    receiving, by a client computing device, a user input selection to schedule a subsequent meeting related to a previous meeting that has already been held;
    prior to the receiving of the user input selection, generating a session recording with a conferencing system, wherein the session recording is stored in a storage system and wherein the session recording is generated by time synchronizing and combining at least two of an audio recording of the previous meeting, a video recording of the previous meeting, and a screen share recording of the previous meeting;
    communicatively linking the client computing device and the storage system over a digital communications network;
    receiving, by the client computing device from the storage system, historical data of the previous meeting, the historical data including identifiers of attendees of the previous meeting;
    generating, by the client computing device, an invite form for scheduling the subsequent meeting;
    populating, by the client computing device without user input, fields of the invite form with the historical data and an indication of the session recording, wherein the fields include an invitee field, and the populating includes populating the invitee field with identifiers of invitees of the subsequent meeting;
    generating, by the client computing device, an invite based on the populated fields of the invite form, wherein the invite includes a session recording field providing a locator for the session recording on the storage system to allow a recipient of the invite to view or download the session recording; and
    transmitting, by the client computing device, the invite to the invitees of the subsequent meeting.

2. The method of claim 1, further comprising:
    selecting, by the client computing device without user input, the identifiers of the invitees of the subsequent meeting from the identifiers of the attendees of the previous meeting.

3. The method of claim 1, further comprising:
    selecting, by the client computing device without user input, the identifiers of the invitees of the subsequent meeting based on a relationship of the identifiers of the invitees of the subsequent meeting to the identifiers of the attendees of the previous meeting.

4. The method of claim 1, wherein:
    the fields of the invite form include a subject field;
    the historical data includes a subject of the previous meeting; and
    the method further comprises:
        populating, by the client computing device without user input, the subject field with the subject of the previous meeting; and
        selecting, by the client computing device without user input, the identifiers of the invitees of the subsequent meeting based on a relationship of the identifiers of the invitees of the subsequent meeting to the subject of the previous meeting.

5. The method of claim 1, further comprising:
    displaying, by the client computing device, a user interface including an execution icon that indicates an option to schedule the subsequent meeting;
    wherein the receiving of the user input selection to schedule the subsequent meeting further comprises receiving a selection of the execution icon.

6. The method of claim 5, wherein:
    the user interface further includes a presentation of the historical data of the previous meeting and at least one other execution icon that indicates an option to access the session recording.

7. The method of claim 6, further comprising:
    downloading, by the client computing device, the session recording from the storage system upon receiving a user input selection of the at least one other execution icon.

8. The method of claim 1, further comprising:
    displaying, by the client computing device, a user interface including a first execution icon and a second execution icon, the first execution icon indicating an option to schedule a follow-up meeting for the subsequent meeting, and the second execution icon indicating an option to schedule a forward-to meeting for the subsequent meeting;
    wherein:
        the receiving of the user input selection to schedule the subsequent meeting further comprises receiving a selection of one of the first and second execution icons;
        the receiving of the selection of the first execution icon causes the client computing device to select the identifiers of the invitees of the subsequent meeting from the identifiers of the attendees of the previous meeting; and
        the receiving of the selection of the second execution icon causes the client computing device to select the identifiers of the invitees of the subsequent meeting based on a relationship of the identifiers of the invitees of the subsequent meeting to the identifiers of the attendees of the previous meeting.

9. The method of claim 1, further comprising:
    receiving, by a second client computing device, the invite;
    displaying, by the second client computing device, the invite with the session recording field of the previous meeting as an execution icon; and
    presenting, by the second client computing device, the session recording of the previous meeting for review by a user of the second client computing device prior to a start time of the subsequent meeting in response to receiving user input selecting the execution icon.

10. The method of claim 1, wherein the session recording further includes a group chat recording time synchronized by the conferencing system with the at least two of an audio recording of the previous meeting, a video recording of the previous meeting, and a screen share recording.

11. The method of claim 1, further comprising:
attaching, by the client computing device without user input, the session recording to the invite that is transmitted to the invitees of the subsequent meeting.

12. A meeting coordination system for scheduling a meeting, comprising:
a storage system;
a conferencing system communicatively linked to the storage system; and
a client computing device, communicatively linked to the conferencing system and the storage system, receiving a user input selection to schedule a subsequent meeting related to a previous meeting that has already been held and for which a session recording has been generated by the conferencing system and stored in a storage system by the conferencing system,
wherein the client computing device further operates to:
receive historical data of the previous meeting, the historical data including identifiers of attendees of the previous meeting and a subject of the previous meeting;
generate an invite form for scheduling the subsequent meeting;
populate, without user input, fields of the invite form with the historical data and an indication of the session recording provided as an execution icon for accessing the session recording, wherein the fields include an invitee field, the populating includes populating the invitee field with identifiers of invitees of the subsequent meeting selected based on a link defined by a relationship between one or more of the attendees and the invitees, and the invitees differing at least in part from the attendees;
generate an invite based on the populated fields of the invite form; and
transmit the invite to the invitees of the subsequent meeting, and
wherein the session recording is generated by the conferencing system by time synchronizing and combining at least two of an audio recording of the previous meeting, a video recording of the previous meeting, and a screen share recording of the previous meeting.

13. The system of claim 12, wherein the client computing device, without user input, attaches the session recording to the invite that is transmitted to the invitees of the subsequent meeting.

14. The system of claim 12, wherein the system further comprises a client computing device associated with one of the invitees of the subsequent meeting that operates in response to receiving the invite to:
display a user interface including a presentation of the historical data of the previous meeting including the execution icon that indicates an option to access the session recording; and
download the session recording from the storage system upon receiving a user input selection of the execution icon.

15. The system of claim 12, wherein the client computing device further operates to:
display a user interface including a first execution icon and a second execution icon, the first execution icon indicating an option to schedule a follow-up meeting for the subsequent meeting, and the second execution icon indicating an option to schedule a forward-to meeting for the subsequent meeting;
wherein:
the receiving of the user input selection to schedule the subsequent meeting further comprises receiving a selection of one of the first and second execution icons;
the receiving of the selection of the first execution icon causes the client computing device to select the identifiers of the invitees of the subsequent meeting from the identifiers of the attendees of the previous meeting; and
the receiving of the selection of the second execution icon causes the client computing device to select the identifiers of the invitees of the subsequent meeting based on a relationship of the identifiers of the invitees of the subsequent meeting to the identifiers of the attendees of the previous meeting, the relationship of the identifiers defining a hierarchy of an enterprise providing links between at least one of the attendees of the previous meeting and the invitees, wherein the invitees differ at least in part from the attendees.

16. A method comprising:
receiving, by at least one server from a client computing device, a request for historical data and an indication of a session recording of a previous meeting that has already been held and for which the session recording has been generated by a conferencing system and stored in a storage system, the historical data including identifiers of attendees of the previous meeting, the client computing device being one of a plurality of client computing devices that also includes other client computing devices, and the session recording being generated, prior to the receiving of the indication, by the conferencing system by time synchronizing and combining at least two of an audio recording of the previous meeting, a video recording of the previous meeting, and a screen share recording of the previous meeting;
transmitting, by the at least one server to the client computing device, the historical data and the indication of the session recording of the previous meeting;
receiving, by the at least one server from the client computing device, a request for data for populating fields of an invite form for a subsequent meeting related to the previous meeting, the fields including an invitee field for identifiers of invitees of the subsequent meeting;
transmitting, by the at least one server to the client computing device, the data for populating the fields;
receiving, by the at least one server from the client computing device, a request to generate a meeting identifier for the subsequent meeting;
transmitting, by the at least one server to the client computing device, the meeting identifier for the subsequent meeting;
receiving, by the at least one server from the client computing device, the meeting invite including the indication of the session recording of the previous meeting and the identifiers of the invitees of the subsequent meeting; and
transmitting, by the at least one server to the other client computing devices indicated by the identifiers of the invitees, the meeting invite,
wherein the request for the data for populating the fields of the invite form for the subsequent meeting includes a request for the identifiers of the invitees of the subsequent meeting, wherein the at least one server without user input produces the identifiers of the invitees of the subsequent meeting based on a relationship of the identifiers of the invitees of the subsequent meeting to the identifiers of the attendees of the previous meeting, the relationship defining a hierarchy for an enterprise that specifies links between the identifiers of the attendees of the previous meeting and of the subsequent meeting, wherein the attendees of the subsequent meeting differ at least in part from the attendees of the previous meeting; and wherein the at least one server transmits the selected identifiers of the invitees of the subsequent meeting to the client computing device.

17. The method of claim 16, further comprising:
receiving, by the at least one server prior to a start time of the subsequent meeting, a request to access the session recording through an invite user interface generated by one of the plurality of client computing devices and which displays the meeting invite with an execution icon that indicates an option to access the session recording.

18. The system of claim 12, wherein the session recording further includes a group chat recording time synchronized by the conferencing system with the at least two of an audio recording of the previous meeting, a video recording of the previous meeting, and a screen share recording.

* * * * *